US007502676B2

(12) United States Patent
Ono et al.

(10) Patent No.: US 7,502,676 B2
(45) Date of Patent: Mar. 10, 2009

(54) TIRE GRIP LEVEL ESTIMATION APPARATUS AND METHOD

(75) Inventors: Eiichi Ono, Toyota (JP); Ken Koibuchi, Susono (JP); Kenji Asano, Toyota (JP)

(73) Assignees: Toyota Jidosha Kabushiki Kaisha, Toyota (JP); Kabushiki Kaisha Toyota Chuo Kenkyusho, Aichi (JP)

( * ) Notice: Subject to any disclaimer, the term of this patent is extended or adjusted under 35 U.S.C. 154(b) by 0 days.

(21) Appl. No.: 11/286,292

(22) Filed: Nov. 25, 2005

(65) Prior Publication Data
US 2006/0074541 A1 Apr. 6, 2006

Related U.S. Application Data

(63) Continuation of application No. PCT/JP2004/007273, filed on May 27, 2004.

(30) Foreign Application Priority Data
May 28, 2003 (JP) ............................. 2003-151226

(51) Int. Cl.
G06F 7/00 (2006.01)
G06F 17/00 (2006.01)
(52) U.S. Cl. ............................ 701/41; 701/48; 701/72
(58) Field of Classification Search ................ 701/1, 701/29, 31, 35, 36, 37, 38, 41, 42, 43, 44, 701/48, 70, 71, 72

See application file for complete search history.

(56) References Cited

U.S. PATENT DOCUMENTS 6,254,204 B1  7/2001 Hara et al.
6,925,371 B2 * 8/2005 Yasui et al. ................ 701/72

(Continued)

FOREIGN PATENT DOCUMENTS

JP       A-07-137647       5/1995

(Continued)

OTHER PUBLICATIONS

Masato Abe; "Operation and Control of Vehicles"; 3rd print; Tokyo-To, Bunkyo-Ku, Hongo 5-5-18; Kabushiki Kaisha Sankaido; May 31, 1996, pp. 26, 27 & 37-40. (with translation).

(Continued)

*Primary Examiner*—Jack W Keith
*Assistant Examiner*—Edward Pipala
(74) *Attorney, Agent, or Firm*—Oliff & Berridge, PLC

(57) ABSTRACT

An SAT estimator 16 estimates the SAT generated between the road surface and the tire. A slip angle arithmetic unit 18 estimates the front wheel slip angle. A lateral force detector 180 computes the lateral force generated in the wheels. An SAT model value arithmetic unit 22 computes the SAT model value from the slip angle estimate and the lateral force value. A front-rear direction quantity-of-state arithmetic unit 240 computes the front-rear direction quantity of state generated in the wheels. A grip level estimator 26 estimates the grip level from the SAT estimated by the SAT estimator 16, the SAT model value computed by the SAT model value arithmetic unit 22, and the front-rear direction quantity of state estimated by the front-rear direction quantity-of-state arithmetic unit 240.

17 Claims, 20 Drawing Sheets

U.S. PATENT DOCUMENTS

| | | | |
|---|---|---|---|
| 6,952,635 B2 * | 10/2005 | Yasui et al. | 701/41 |
| 2001/0029419 A1 | 10/2001 | Matsumoto et al. | |
| 2002/0011093 A1 | 1/2002 | Matsuno | |
| 2003/0051560 A1 | 3/2003 | Ono et al. | |
| 2004/0019417 A1 * | 1/2004 | Yasui et al. | 701/36 |
| 2004/0019423 A1 * | 1/2004 | Yasui et al. | 701/71 |
| 2004/0148077 A1 * | 7/2004 | Yasui et al. | 701/41 |
| 2004/0186649 A1 * | 9/2004 | Ono et al. | 701/80 |
| 2005/0005691 A1 * | 1/2005 | Ono et al. | 73/146 |
| 2005/0055149 A1 * | 3/2005 | Kato et al. | 701/80 |
| 2005/0067213 A1 * | 3/2005 | Yasui et al. | 180/443 |
| 2005/0096830 A1 * | 5/2005 | Ohta et al. | 701/91 |
| 2005/0125131 A1 * | 6/2005 | Kato et al. | 701/70 |
| 2005/0216155 A1 * | 9/2005 | Kato et al. | 701/41 |

FOREIGN PATENT DOCUMENTS

| | | |
|---|---|---|
| JP | A-11-291929 | 10/1999 |
| JP | A-2000-052964 | 2/2000 |
| JP | A-2001-171504 | 6/2001 |
| JP | A-2002-4931 | 1/2002 |
| JP | A-2002-012160 | 1/2002 |
| JP | A-2002-039744 | 2/2002 |

OTHER PUBLICATIONS

Kabuya Industry Co. Ltd.; "Suspension of a Car"; 7th print; Tokyo-To, Bunkyo-Ku, Hongo 5-5-18; Kabushiki Kaisha Sankaido; Jul. 10, 1995; pp. 97, 218-220. (with translation).

* cited by examiner

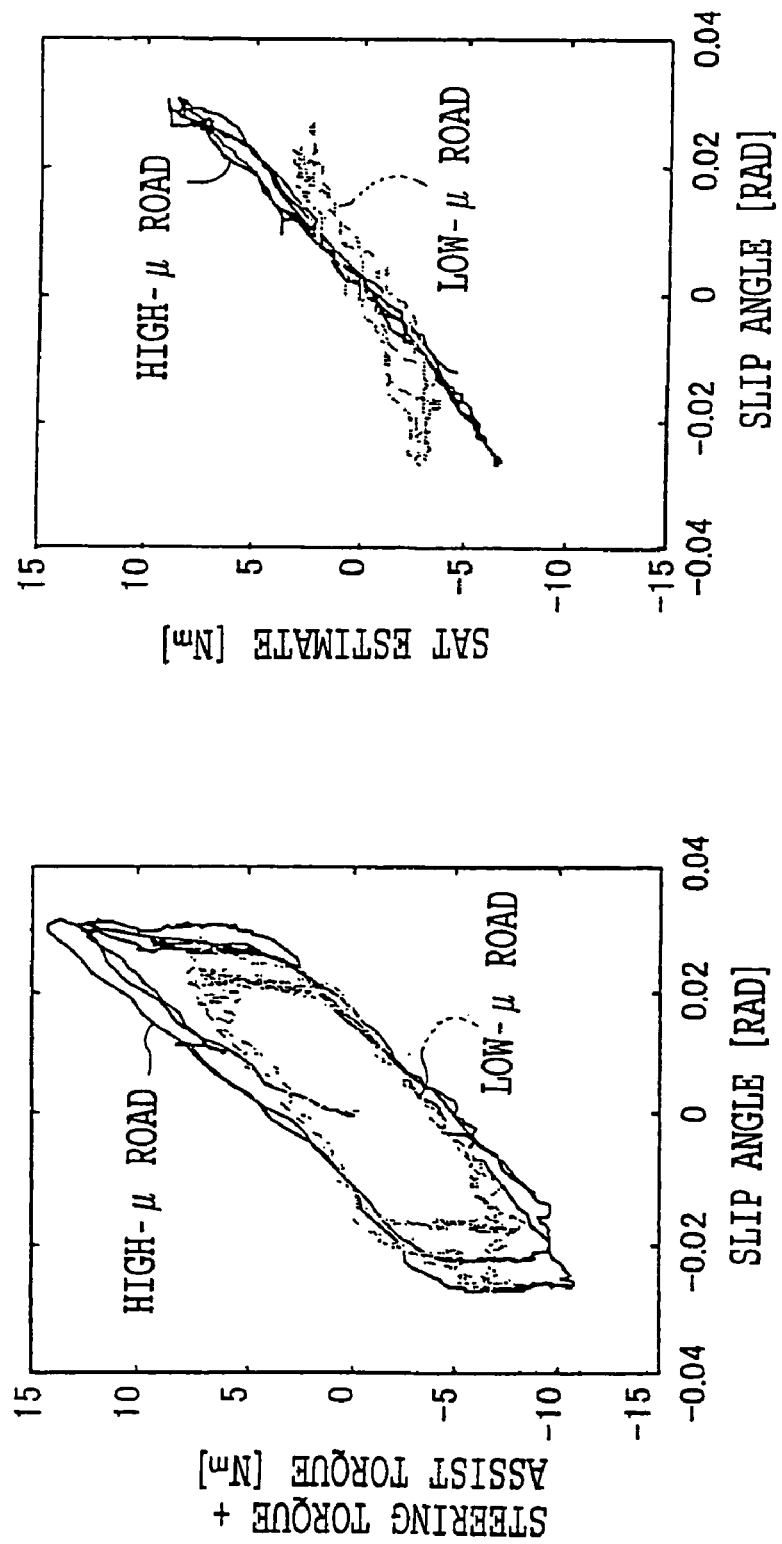

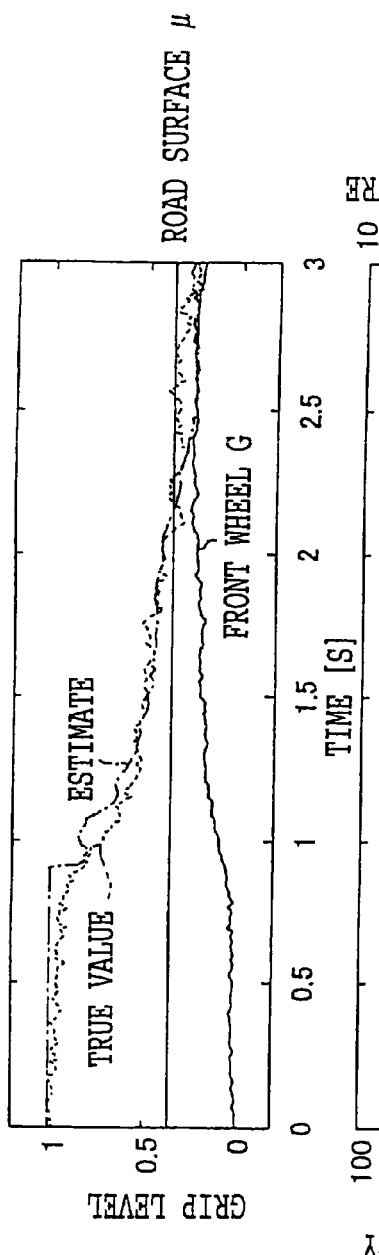
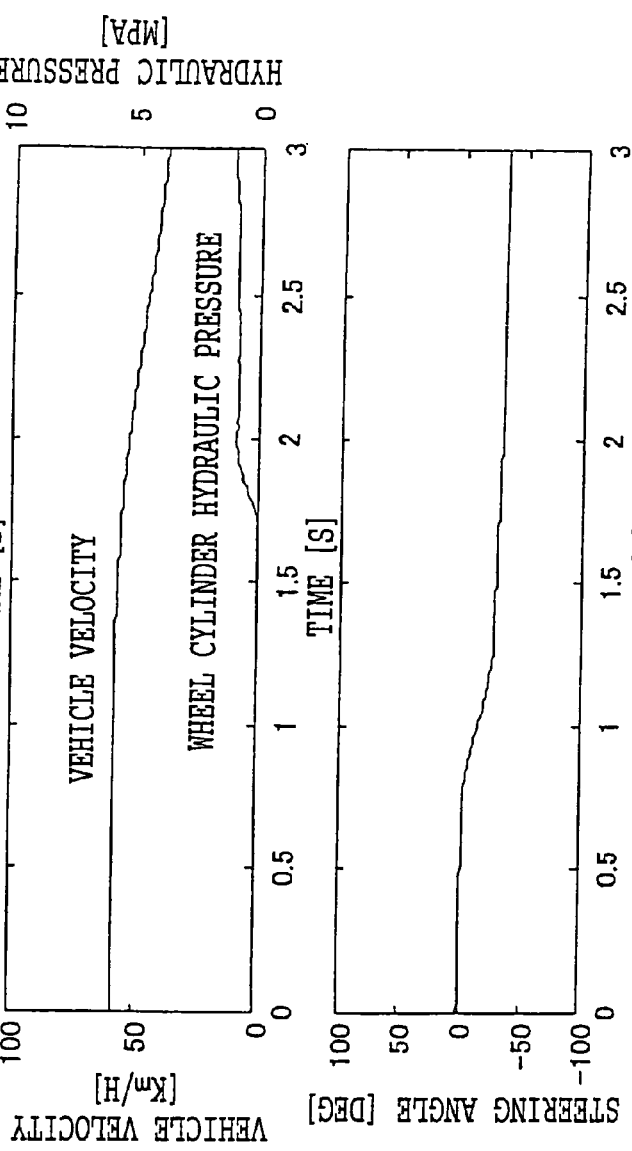
FIG. 12A
FIG. 12B
FIG. 12C

WITH LATERAL LOAD VARIATION COMPENSATION

WITHOUT LATERAL LOAD VARIATION COMPENSATION

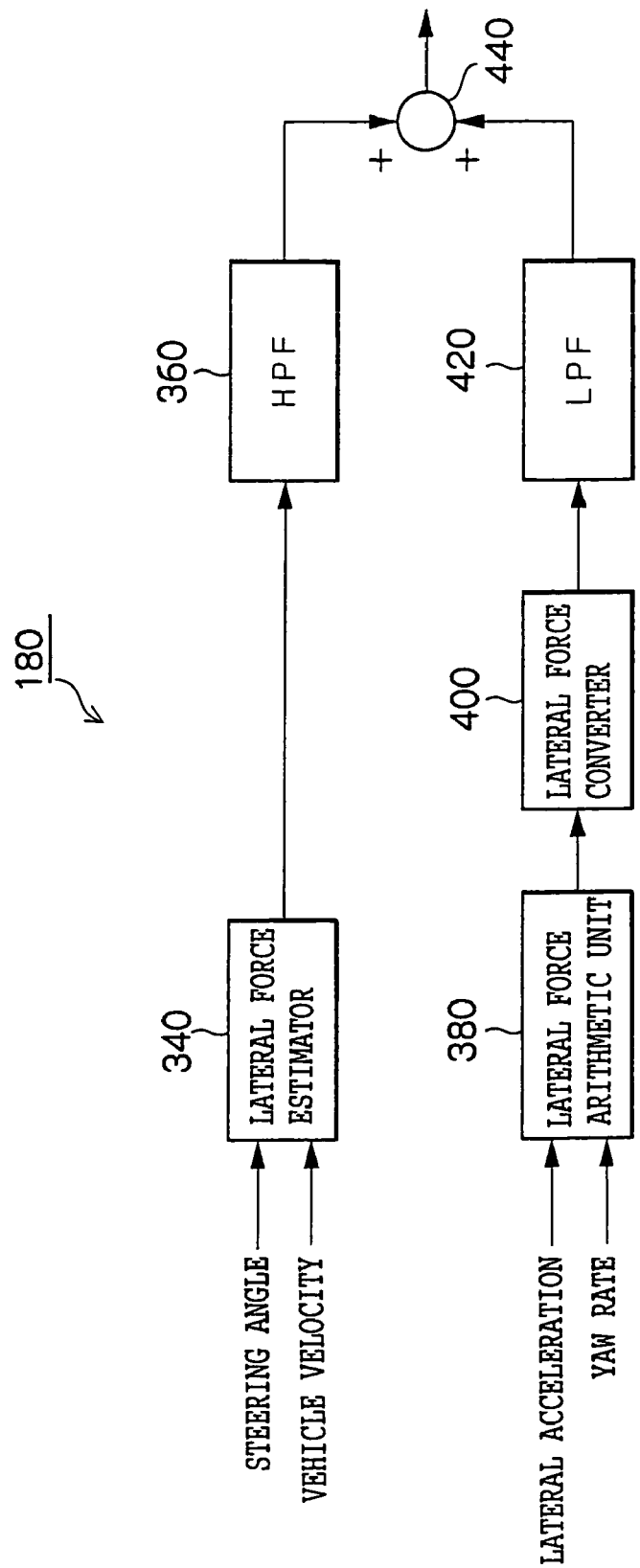

TURNING-WHILE-ACCELERATING EXPERIMENTAL RESULT

F I G. 2 3
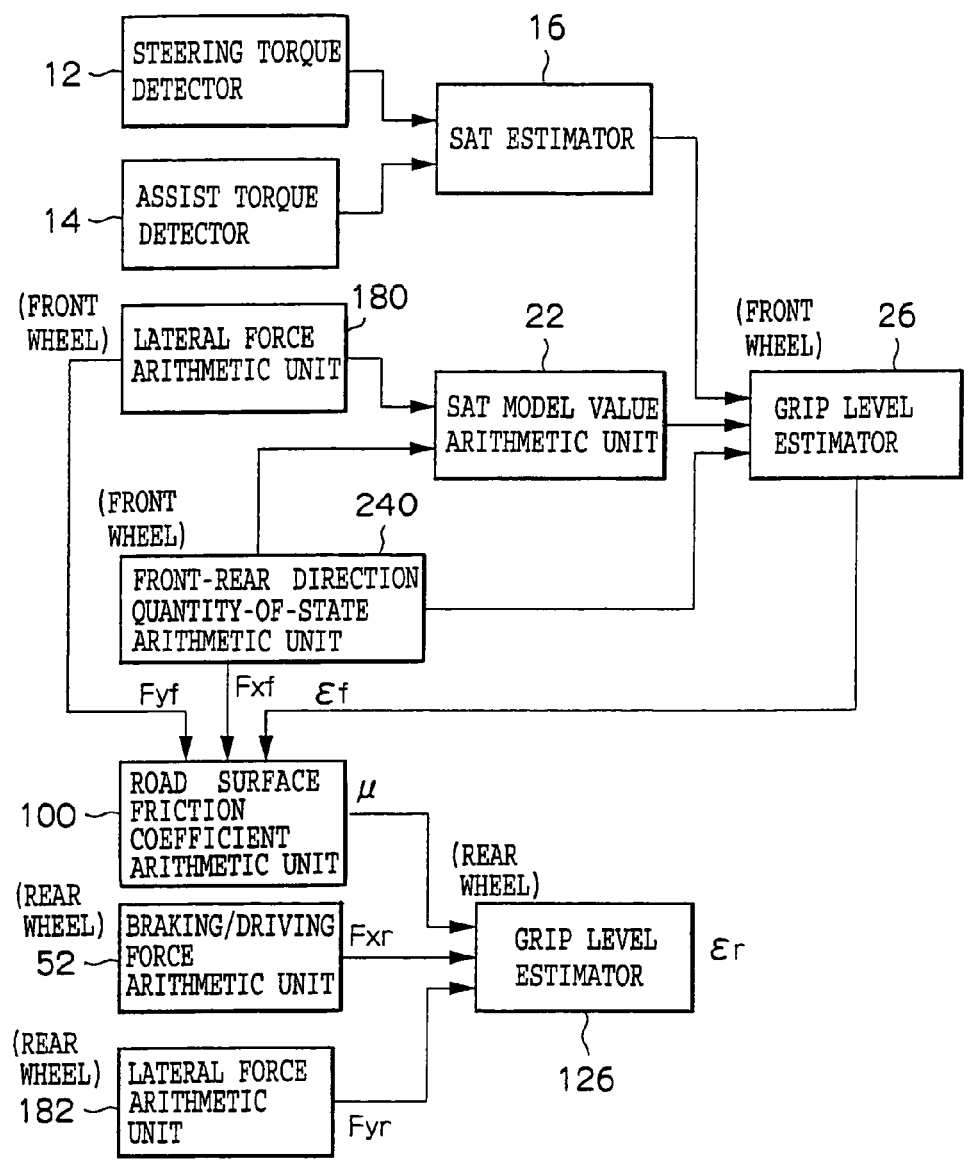

F I G. 2 4
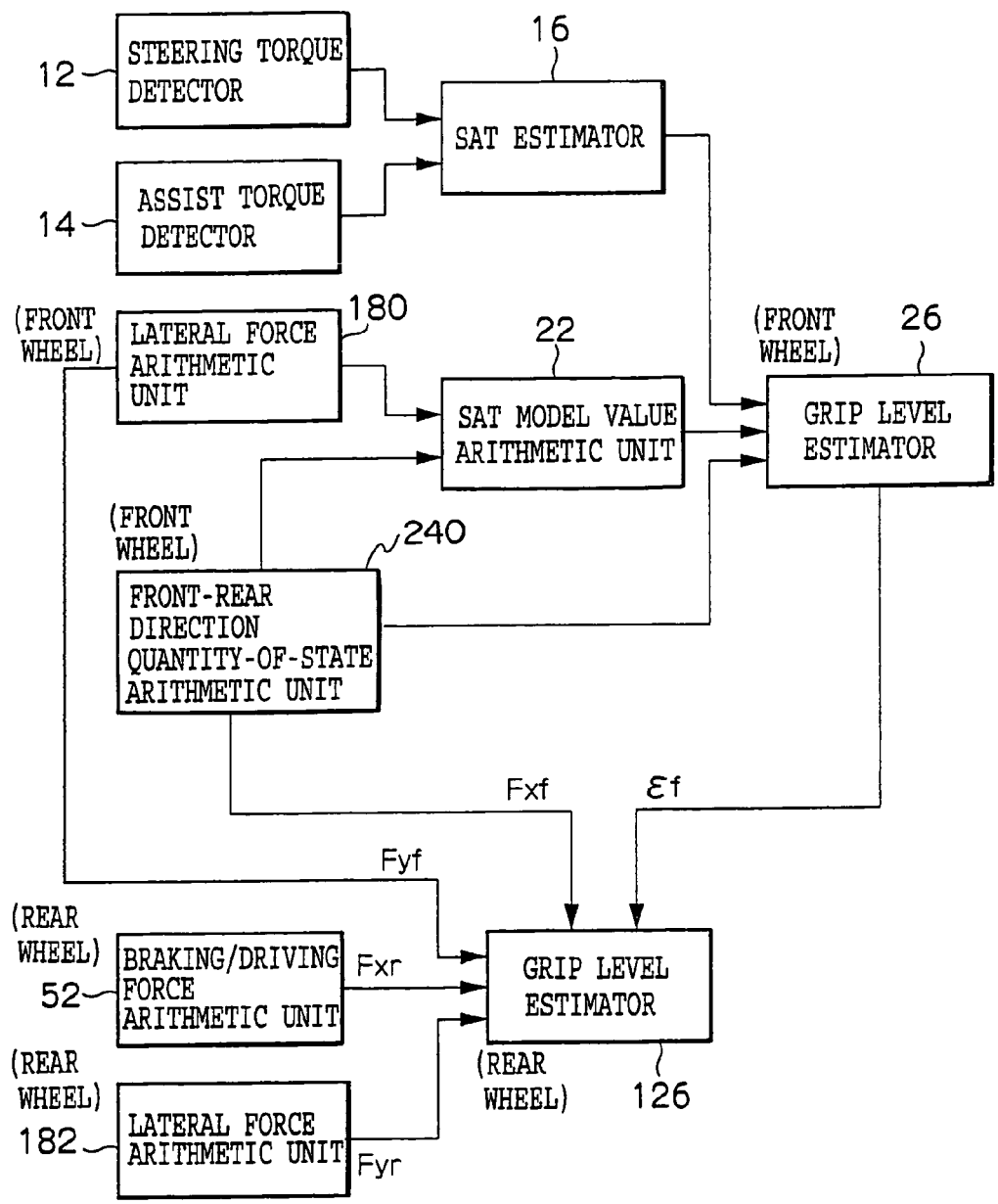

TIRE GRIP LEVEL ESTIMATION APPARATUS AND METHOD

This is a Continuation of International Application No. PCT/JP2004/007273 filed May 27, 2004, which claims the benefit of Japanese Patent Application No. 2003-151226 filed May 28, 2003. The entire disclosure of the prior applications is hereby incorporated by reference herein in its entirety.

FIELD OF THE INVENTION

The present invention relates to a tire grip level estimation apparatus and method, and a running condition control method.

DESCRIPTION OF THE RELATED ART

Conventionally, an apparatus which utilizes the self-aligning torque for estimation of the grip level has been proposed (refer to Patent Literature 1).

Patent Literature 1: Laid-Open Publication No. 2002-12160

DISCLOSURE OF THE INVENTION

Problems To Be Solved By The Invention

However, with the above-mentioned conventional apparatus, the braking/driving force which is generated in the braked/driven wheels for braking/driving the vehicle, the lateral force, and the like are not considered when the grip condition is estimated by utilizing the self-aligning torque. Therefore, the grip level in the braked state or the driven state cannot be estimated with high accuracy.

The present invention has been made in view of the above circumstances, and the purpose thereof is to provide a grip level estimation apparatus which is capable of estimating the grip level with high accuracy when the vehicle is subjected to a force in the front-rear direction or the lateral direction.

Means to Solve the Problems

To achieve the above-mentioned purpose, a tire grip level estimation apparatus according to the invention as defined in claim 1 comprises self-aligning torque acquisition means which estimates or detects self-aligning torque generated on the grounding surface of wheels; lateral direction quantity-of-state computation means which computes lateral direction quantity of state generated in said wheels; front-rear direction quantity-of-state computation means which computes front-rear direction quantity of state generated in said wheels; self-aligning model value computation means which computes self-aligning torque model value on the basis of said lateral direction quantity of state and tire parameter; ratio computation means which computes the self-aligning ratio, which is the ratio between the self-aligning torque estimated or detected by said self-aligning torque acquisition means and the self-aligning torque model value computed by said self-aligning model value computation means; and grip level estimation means which estimates grip level of the tires on the basis of said self-aligning ratio and said front-rear direction quantity of state.

The self-aligning torque acquisition means acquires the self-aligning torque generated on the grounding surface of wheels by estimating or detecting it.

The lateral direction quantity-of-state computation means computes the lateral direction quantity of state generated in said wheels, and the front-rear direction quantity-of-state computation means computes the front-rear direction quantity of state generated in said wheels.

The self-aligning model value computation means computes the self-aligning torque model value on the basis of the lateral direction quantity of state and the tire parameters. The ratio computation means computes the self-aligning ratio. The self-aligning ratio is the ratio between the self-aligning torque estimated or detected by the self-aligning torque acquisition means and the self-aligning torque model value computed by the self-aligning model value computation means.

And, the grip level estimation means estimates the grip level of the tires on the basis of the self-aligning ratio and the front-rear direction quantity of state.

Thus, on the basis of the lateral direction quantity of state and the tire parameters, the self-aligning torque model value is computed, the ratio between the self-aligning torque and the self-aligning torque model value (the self-aligning ratio) being computed, and on the self-aligning ratio and the front-rear direction quantity of state, the grip level of the tires is estimated, thus the grip level can be estimated with high accuracy.

A tire grip level estimation apparatus according to the invention as defined in claim 2 comprises self-aligning torque acquisition means which estimates or detects self-aligning torque generated on the grounding surface of wheels; lateral direction quantity-of-state computation means which computes lateral direction quantity of state generated in said wheels; self-aligning model value computation means which computes self-aligning torque model value on the basis of said lateral direction quantity of state, front-rear direction quantity of state, and tire parameter; ratio computation means which computes self-aligning ratio, which is the ratio between the self-aligning torque estimated or detected by said self-aligning torque acquisition means and the self-aligning torque model value computed by said self-aligning model value computation means; and grip level estimation means which estimates the grip level of the tires on the basis of said self-aligning ratio.

The self-aligning torque acquisition means estimates or detects the self-aligning torque generated on the grounding surface of wheels. The lateral direction quantity-of-state computation means computes the lateral direction quantity of state generated in the wheels. The front-rear direction quantity-of-state computation means computes the front-rear direction quantity of state generated in the wheels.

The self-aligning model value computation means computes the self-aligning torque model value on the basis of the lateral direction quantity of state, the front-rear direction quantity of state, and the tire parameters.

The ratio computation means computes the self-aligning ratio, and the grip level estimation means estimates the grip level of the tires on the basis of the self-aligning ratio.

Thus, on the basis of the lateral direction quantity of state and the front-rear direction quantity of state which are generated in the wheels, and the tire parameters, the self-aligning torque model value is computed, the self-aligning ratio being computed, and on the self-aligning ratio, the grip level of the tires is estimated, thus the grip level can be estimated with high accuracy.

With the invention as defined in claim 2, the tire grip level estimation means may be adapted to estimate the grip level of the tires using the front-rear direction quantity of state in addition to the self-aligning ratio, as in claim 3. Thereby, the grip level can be estimated with higher accuracy.

With the invention as defined in any one of claim 1 to claim 3, said lateral direction quantity of state is slip angle, said front-rear direction quantity of state is front-rear force or quotient obtained by dividing the front-rear force by the cornering power, and said tire parameters may be the tire grounding length and the tire stiffness, as in claim 4.

With the invention as defined in any one of claim 1 to claim 3, said lateral direction quantity of state is lateral force, said front-rear direction quantity of state is front-rear force, and tire parameters may be the tire grounding length and the tire stiffness, as in claim 5.

With the invention as defined in any one of claim 1 to claim 3, said lateral direction quantity of state is lateral force, said front-rear direction quantity of state is quotient obtained by dividing the front-rear force by the cornering power, and said tire parameter is the tire grounding length as in claim 6.

The invention as defined in claim 7 provides the invention as defined in any one of claim 1 to claim 3, further comprising vehicle velocity detection means which detects vehicle velocity, and steering angle detection means which detects steering angle, wherein said lateral direction quantity-of-state computation means comprises estimation means which estimates lateral force generated in the tires from said vehicle velocity and said steering angle on the basis of vehicle linear model; a high-pass filter for high-pass-filter processing of the lateral force estimated by said lateral force estimation means; lateral force computation means which computes the lateral force generated in the tires from the quantities of vehicle state; a low-pass filter for low-pass-filter processing of the lateral force computed by said lateral force computation means; and computation means which computes the sum of the lateral force which is high-pass-filter processed by said high-pass filter and the lateral force which is low-pass-filter processed by said low-pass filter, as the lateral direction quantity of state.

The invention as defined in claim 8 provides the invention as defined in any one of claim 1 to claim 3, wherein said front-rear direction quantity-of-state computation means comprises:

braking/driving force estimation means which estimates the braking/driving force on the basis of engine output and braking hydraulic pressure; and a divider which computes the front-rear direction quantity of state by dividing said braking/driving force by the cornering power.

As the other inventions, the following inventions are proposed.

Firstly, a tire grip level estimation apparatus comprising self-aligning torque acquisition means which estimates or detects self-aligning torque generated on a grounding surface of wheels; lateral direction quantity-of-state computation means which computes lateral direction quantity of state generated in said wheels; self-aligning model value computation means which computes self-aligning torque model value on the basis of said lateral direction quantity of state and a tire parameter; ratio computation means which computes self-aligning ratio, which is the ratio between the self-aligning torque estimated or detected by said self-aligning torque acquisition means and the self-aligning torque model value computed by said self-aligning model value computation means; and grip level estimation means which estimates grip level of the tires on the basis of said self-aligning ratio and the tire parameters.

Secondly, a tire grip level estimation apparatus comprising self-aligning torque acquisition means which estimates or detects self-aligning torque generated on a grounding surface of wheels; lateral direction quantity-of-state computation means which computes lateral direction quantity of state generated in said wheels; front-rear direction quantity-of-state computation means which computes front-rear direction quantity of state generated in said wheels; self-aligning model value computation means which computes self-aligning torque model value on the basis of said lateral direction quantity of state, said front-rear direction quantity of state, and the predetermined tire parameters; ratio computation means which computes self-aligning ratio, which is the ratio between the self-aligning torque estimated or detected by said self-aligning torque acquisition means and the self-aligning torque model value computed by said self-aligning model value computation means; and grip level estimation means which estimates grip level of the tires on the basis of said self-aligning ratio, said front-rear direction quantity of state, and the tire parameter.

A grip level estimation apparatus according to the invention as defined in claim 9 comprises self-aligning torque acquisition means which estimates or detects self-aligning torque generated on the grounding surface of wheels; slip angle computation means which computes slip angle generated in said wheels; self-aligning torque model value computation means which computes self-aligning torque model value on the basis of the slip angle computed by said slip angle computation means, and grounding length and stiffness of said wheels; self-aligning torque ratio computation means which computes self-aligning torque ratio, which is the ratio between the self-aligning torque estimated by said self-aligning torque acquisition means and the self-aligning torque model value computed by said self-aligning model value computation means; braking/driving force estimation means which estimates the braking/driving force generated in the braked/driven wheels for braking/driving a vehicle; and grip level estimation means which estimates the grip level for said braked/driven wheels on the basis of the self-aligning torque ratio computed by said self-aligning torque ratio computation means and the braking/driving force estimated by said braking/driving force estimation means.

The self-aligning torque acquisition means according to the present invention estimates the self-aligning torque generated on the grounding surface of wheels. The wheels can be the front wheels for the vehicle as in claim 14, or can be all the wheels mounted to the vehicle as in claim 15. Further, the wheels can be the rear wheels for the vehicle. Still further, the wheels can be the steered wheels or the non-steered wheels.

The slip angle computation means computes the slip angle generated in said wheels. As in claim 13, the slip angle computation means can be comprised of slip angle estimation means which estimates slip angle from the vehicle velocity and the steering angle on the basis of the vehicle linear model; a high-pass filter for high-pass-filter processing of the slip angle estimated by said slip angle estimation means; lateral force computation means which computes lateral force to said wheels; slip angle computation means which divides the lateral force computed by said lateral force computation means by the cornering power for said wheels for computing the slip angle converted from the lateral force; a low-pass filter for low-pass-filter processing of the slip angle converted by said slip angle conversion means; and addition means which adds the slip angle high-pass-filter processed by said high-pass filter and the slip angle low-pass-filter processed by said low-pass filter for computing the slip angle generated in said wheels.

The self-aligning torque model value computation means computes the self-aligning torque model value on the basis of the slip angle computed by the slip angle computation means, and the grounding length and stiffness of the wheels. The self-aligning torque ratio computation means computes the self-aligning torque ratio, which is the ratio between the self-aligning torque estimated by said self-aligning torque estimation means and the self-aligning torque model value computed by said self-aligning model value computation means.

The braking/driving force estimation means estimates the braking/driving force generated in the braked/driven wheels for braking/driving the vehicle.

And the grip level estimation means estimates the grip level for the wheels on the basis of the self-aligning torque ratio computed by the self-aligning torque ratio computation means and the braking/driving force estimated by the braking/driving force estimation means. As in claim 10, the grip level estimation means can be adapted to comprise storage means which previously stores the relationship among the self-aligning torque ratio, the braking/driving force and the grip level, estimating the grip level for the wheels on the basis of the self-aligning torque ratio computed by the self-aligning torque ratio computation means and the braking/driving force estimated by the braking/driving force estimation means, and the above-mentioned relationship stored by said storage means.

Thus, on the basis of the self-aligning torque ratio, and the braking/driving force estimated by the braking/driving force estimation means, the grip level for the wheels is estimated, which allows highly accurate estimation of the grip level when the vehicle is in the braked/driven state.

By the way, as in claim 11, the grounding length and stiffness of said wheels can be of predetermined values. However, when the vehicle is in the braked/driven state, the condition of load on the wheels may be varied. Then, as in claim 12, load condition estimation means which estimates condition of load on the wheels, is further comprised, and the grounding length and stiffness of the wheels are determined on the basis of the condition of load on the wheels that is estimated by the load condition estimation means.

Thus, the grounding length and stiffness of the wheels are determined on the basis of the condition of load on the wheels for computing the self-aligning torque model value and estimating the grip level for the wheels, which allows more accurate estimation of the grip level when the vehicle is in the braked/driven state.

The invention as defined in claim 16 estimates the grip level on the basis of the self-aligning torque estimate determined from the steering condition, the self-aligning torque model value determined from the vehicle condition, and the braking/driving force. Therefore, the grip level can be accurately detected with no effects given by the braking/driving force.

In this case, as in claim 17, the torque around the king pin may be computed from tie rod axis force and the knuckle arm length to provide a self-aligning torque estimate. Therefore, the self-aligning torque estimate can be computed with accuracy.

In the above-mentioned claim 16 or claim 17, the grip level for each wheel may be estimated as in claim 18. In other words, the grip level for each wheel can be obtained.

The invention as defined in claim 19 controls the running condition by using the grip level for each wheel that is estimated in claim 18.

Thus, the running condition is controlled by using the grip level for each wheel that is estimated with high accuracy, which allows the running condition to be highly accurately controlled.

In this case, the running condition may be controlled such that the running condition is stabilized, as in claim 20.

Specifically, as in claim 21, the control of the running condition may be at least one of adjusting of the braking force such that the grip level for the four wheels is uniform in turning while braking; estimating the grip level for the driven wheels, and when the grip level is low, suppressing dropping of the grip level; carrying out spin suppression control when the grip level for the rear wheels is lowered to a prescribed value or less; carrying out driftout suppression control when the grip level for the front wheels is lowered to a prescribed value or less; decreasing the velocity when the grip levels for all the wheels are lowered to a prescribed value or less; decreasing the front wheel steering angle when the grip level for the rear wheels is lowered to a prescribed value or less; and increasing the stiffness of the stabilizer for the front wheels when the grip level for the rear wheels is lowered to a prescribed value or under.

Herein, if the braking force is adjusted such that the grip level is uniform for the four wheels in turning while braking, as mentioned above, the grip level allowance is rendered uniform, which makes it possible to assure an optimum braking force distribution.

In addition, the grip level for the driven wheels is estimated, and when the grip level is low, suppressing the lowering of the grip level allows the traction control to be carried out at the stage earlier than the occurrence of an excessive slippage.

Further, when the grip level for the rear wheels is lowered to a prescribed value or under, carrying out spin suppression control makes it possible to provide a good turning behavior, or when the grip level for the front wheels is lowered to a prescribed value or less, carrying out driftout suppression control also makes it possible to provide a good turning behavior.

In addition, when the grip levels for all the wheels are lowered to a prescribed value or less, decreasing the velocity allows the four wheel drift to be detected and controlled.

Further, when the grip level for the rear wheels is lowered to a prescribed value or less, in other words, when there arises the possibility of oversteering, decreasing the front wheel steering angle reduces the lateral force to the front wheels, allowing the balance to be restored.

In addition, when the grip level for the rear wheels is lowered to a prescribed value or less, in other words, when there arises the possibility of oversteering, enhancing the stiffness of the stabilizer for the front wheels increases the difference in load between the right and left front wheels, which decreases the difference in load between the right and left rear wheels for increasing the grip level for the rear wheels.

EFFECTS OF THE INVENTION

The invention as defined in claim 1 computes the self-aligning torque model value on the basis of the lateral direction quantity of state and the tire parameters; computes the ratio between the self-aligning torque and the self-aligning torque model value (the self-aligning torque ratio); and estimates the grip level of the tires on the basis of the self-aligning ratio and the front-rear direction quantity of state, thus providing an effect that the grip level can be estimated with high accuracy.

The invention as defined in claim 2 computes the self-aligning torque model value on the basis of the lateral direction quantity of state and front-rear direction quantity of state which are generated in the wheels, and the tire parameters, computing the self-aligning ratio, and estimates the grip level of the tires on the basis of the self-aligning ratio, thus providing an effect that the grip level can be estimated with high accuracy.

The invention as defined in claim 9 estimates the grip level for the wheels on the basis of the self-aligning torque ratio, and the braking/driving force estimated by the braking/driving force estimation means, thus providing an effect that the grip level when the vehicle is in the braked/driven state can be estimated with high accuracy.

The invention as defined in claim 16 estimates the grip level on the basis of the self-aligning torque estimate determined from the steering condition, the self-aligning torque model value determined from the vehicle condition, and the braking/driving force, thus providing an effect that the grip level can be accurately detected with no effects given by the braking/driving force.

The invention as defined in claim 19 estimates the grip level for each wheel, and controls the running condition by using the grip level estimated for each wheel, thus providing an effect that the running condition can be detected with high accuracy.

BRIEF DESCRIPTION OF THE DRAWINGS

FIG. 10A is a diagram illustrating the relationship between the slip angle and the steering torque plus assist torque, and FIG. 10B is a diagram illustrating the relationship between the slip angle and the SAT estimate;

FIG. 12A to FIG. 12C are diagrams comparing the grip level estimate with the true value in braking;

FIG. 21 is a block diagram for a lateral force arithmetic unit;

FIG. 23 is a block diagram for a grip level estimation apparatus according to an eighth embodiment;

FIG. 24 is a block diagram for a grip level estimation apparatus according to a ninth embodiment;

BEST MODE FOR CARRYING OUT THE INVENTION

First Embodiment

Hereinbelow, a first embodiment of the present invention will be described with reference to the drawings.

Figure 1:
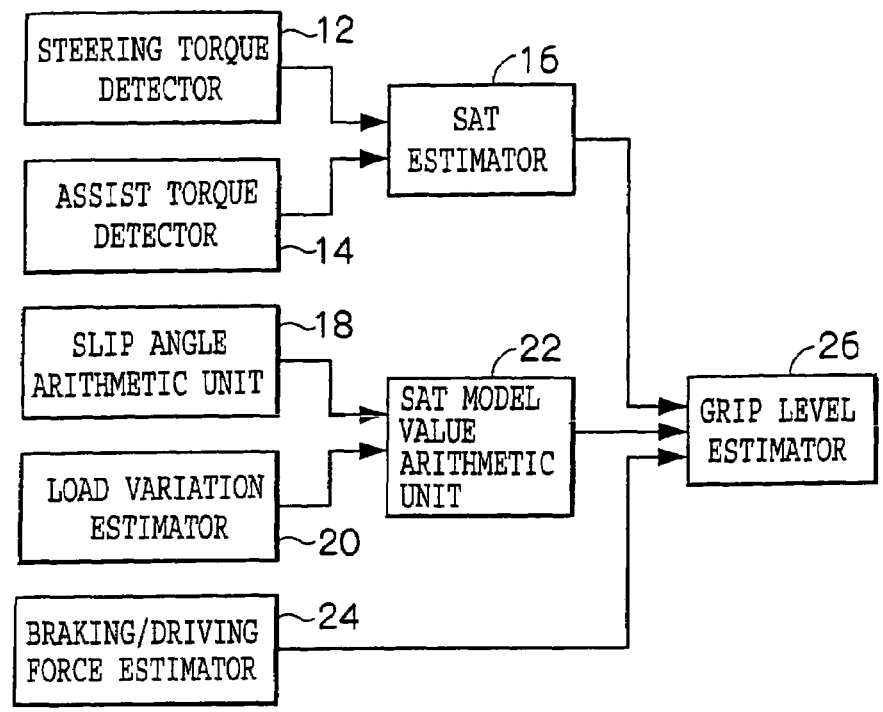
FIG. 1 is a block diagram for a grip level estimation apparatus according to a first embodiment.

As shown in FIG. 1, a grip level estimation apparatus according to the present embodiment comprises a steering torque detector 12 which detects the steering torque when the driver steers a steering system (not shown), an assist torque detector 14 which detects the assist torque provided by a power steering system (not shown), and an SAT estimator 16 which estimates the SAT generated between the road surface and the tire by eliminating the friction in the steering system from the steering torque detected by the steering torque detector 12 and the assist torque detected by the assist torque detector 14. The SAT estimator 16 can be configured with a computer.

In addition, the grip level estimation apparatus comprises a slip angle arithmetic unit 18 which estimates the front wheel slip angle from the vehicle velocity, the steering angle, and the like from a vehicle velocity detection sensor and a steering angle detection sensor (which are not shown); a load variation estimator 20 which estimates the change in load on the steered wheels that is involved in braking/driving from the front-rear acceleration signal for the vehicle, and the like; and an SAT model value arithmetic unit 22 which computes the linear model output for the SAT, i.e., the SAT model value by multiplying the slip angle by the origin slope with respect to the slip angle for the SAT from the slip angle estimate and the load variation. The slip angle arithmetic unit 18, the load variation estimator 20, and the SAT model value arithmetic unit 22 can be configured with a computer.

Further, the grip level estimation apparatus comprises a braking/driving force estimator 24 which estimates the braking/driving force generated in the braked/driven wheels for braking/driving the vehicle, and a grip level estimator 26 which estimates the grip level from the SAT estimated by the SAT estimator 16, the SAT model value computed by the SAT model value arithmetic unit 22, and the braking/driving force estimated by the braking/driving force estimator 24. The braking/driving force estimator 24 can be configured with a computer.

Figure 2:
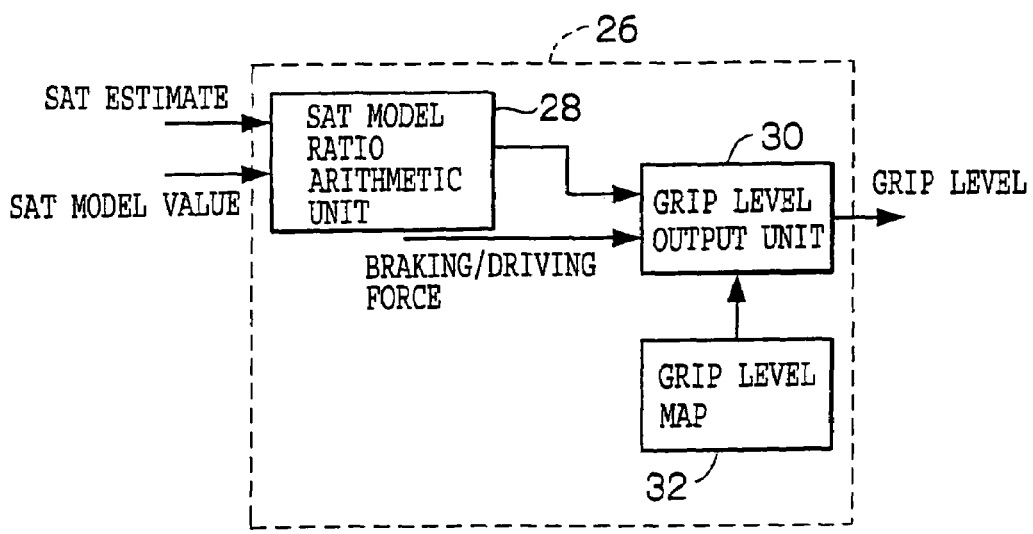
FIG. 2 is a block diagram for a grip level estimator.

As shown in FIG. 2, the grip level estimator 26 comprises an SAT model ratio arithmetic unit 28 which computes the ratio of the SAT to the SAT model value as the SAT model ratio from the SAT estimated by the SAT estimator 16 and the SAT model value computed by the SAT model value arithmetic unit 22; a memory 32 which stores a grip level map which is a three-dimensional map representing the relationship among the SAT model ratio, braking/driving force, and grip level; and a grip level output unit 30 which computes and outputs the grip level on the basis of the SAT model ratio computed by the SAT model ratio arithmetic unit 28, the braking/driving force estimated by the braking/driving force estimator 24, and the grip level map representing the relationship among the SAT model ratio, braking/driving force, and grip level. The SAT model ratio arithmetic unit 28 and the grip level output unit 30 can be configured with a computer.

Figure 3:
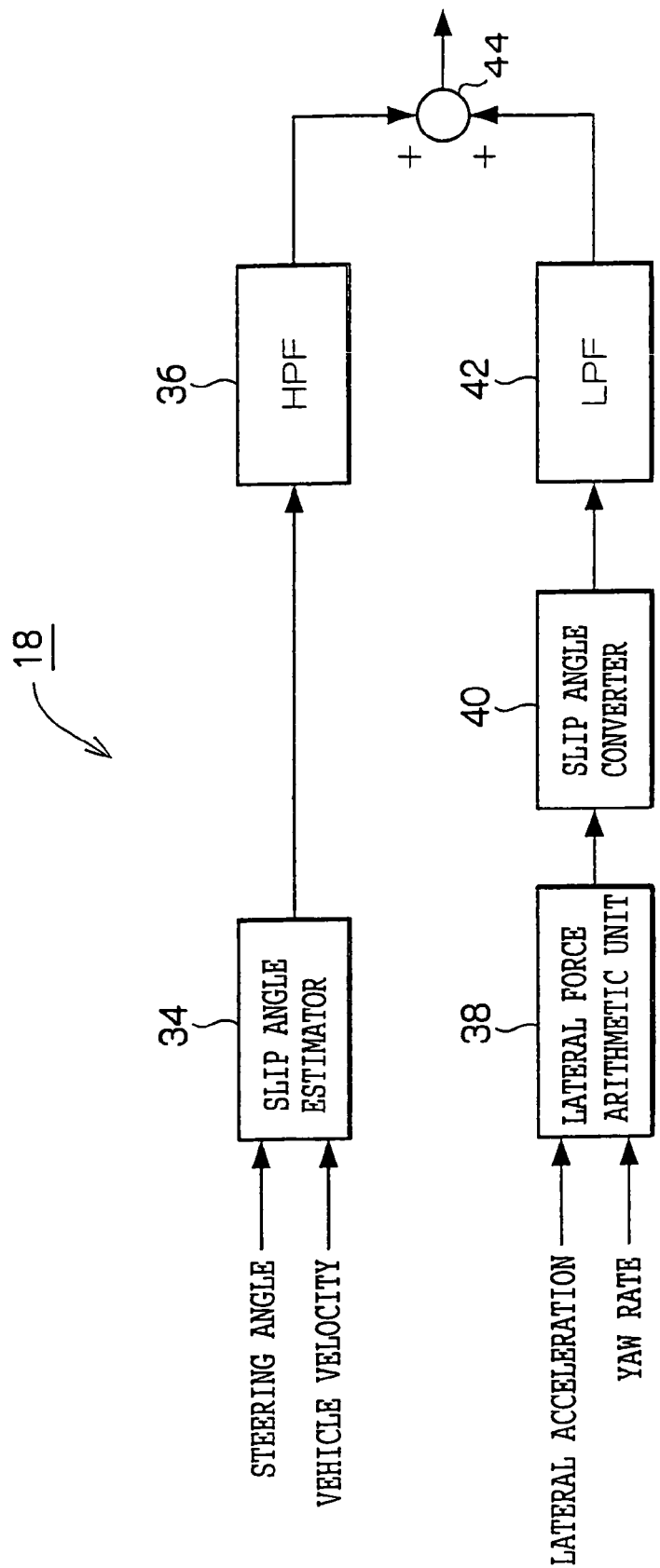
FIG. 3 is a block diagram for a slip angle arithmetic unit.

As shown in FIG. 3, the slip angle arithmetic unit 18 comprises a slip angle estimator 34 which computes the slip angle estimate on the basis of the vehicle linear model from the vehicle velocity and steering angle from the above-mentioned vehicle velocity detection sensor and steering angle detection sensor; a lateral force arithmetic unit 38 which inputs the lateral acceleration and the yaw rate from a lateral acceleration detection sensor and a yaw rate detection sensor (not shown) and computes the lateral force to the front wheels from the quantities of the vehicle motion states; a slip angle converter 40 which computes the slip angle converted value for the lateral force computed value by dividing the lateral force computed value by the front wheel cornering power; a high-pass filter 36 which high-pass processes the slip angle estimate; a low-pass filter 42 which low-pass processes the slip angle estimate; and an adder 44 which adds the slip angles following the high-pass-filter and low-pass-filter processing for computing the combined slip angle. The above-mentioned devices (34 to 44) can be configured with a computer.

Next, the principle of estimation of the grip level in the present embodiment will be described.

By defining the front-rear slip and the lateral slip as:
[Math. 1]

Math. 1

$$\kappa_x = \frac{s}{1-s}, \kappa_y = \frac{K_\beta}{K_s}\frac{\tan\beta}{1-s} \quad \text{(in braking)} \quad (1)$$

$$\kappa_x = s, \kappa_y = \frac{K_\beta}{K_s}(1+s)\tan\beta \quad \text{(in driving)} \quad (2)$$

where s is slip rate; $\beta$ is slip angle; $K_\beta$ is lateral force resisting stiffness for a given slip angle; and $K_s$ is front-rear force resisting stiffness for a given slip rate, the tire generated force by the brush model can be expressed, being simplified as the following expressions:
[Math. 2]

Math. 2

$$F = -\mu F_z(1-\xi_s^3) \quad (3)$$

$$F_x = F \cos\theta \quad (4)$$

$$F_y = F \sin\theta \quad (5)$$

where
[Math. 3]

Math. 3

$$\xi_s = 1 - \frac{K_s}{3\mu F_z}\kappa \quad (6)$$

$$\kappa = \sqrt{\kappa_x^2 + \kappa_y^2} \quad (7)$$

where $\mu$ is road surface friction coefficient (road surface $\mu$) F is tire generated force; $F_x$ is braking/driving force; $F_y$ is lateral force; and $F_z$ is grounding force. Now, assuming that the direction of the tire generated force is identical to the direction of slip, the following expressions are obtained.

[Math. 4]

Math. 4

$$\kappa_x = \kappa \cos\theta \quad (8)$$

$$\kappa_y = \kappa \sin\theta \quad (9)$$

Herein, by using the above relationship, the description of the SAT in braking/driving will be arranged. First, as a preparation, arranging Eqs. (6) and (9), the following expression is obtained.
[Math. 5]

Math. 5

$$3\mu F_z \sin\theta = \frac{K_s}{1-\xi_s}\kappa_y \quad (10)$$

and arranging Eqs. (3) and (4), the following expression is obtained.
[Math. 6]

Math. 6

$$\mu F_z \cos\theta = -\frac{F_x}{1-\xi_s^3} \quad (11)$$

Further, from Eqs. (6), (8), and (11), the following expression is obtained.
[Math. 7]

Math. 7

$$\kappa_x = \frac{3\mu F_z}{K_s}(1-\xi_s)\cos\theta = \frac{3F_x(1-\xi_s)}{K_s(1-\xi_s^3)} = -\frac{3F_x}{K_s(1+\xi_s+\xi_s^2)} \quad (12)$$

By the way, it is known that the SAT in braking can be expressed as follows ("Motion and Control of Motor Vehicles", 37/39, by SANKAIDO PUBLISHING Co., Ltd. (1992)):
[Math. 8]

Math. 8

$$T_{sat} = \frac{lK_\beta \tan\beta}{2(1-s)}\xi_s^2\left(1-\frac{4}{3}\xi_s\right) - \frac{3}{2}l\mu F_z \sin\theta \cdot \xi_s^2(1-\xi_s)^2 + \quad (13)$$
$$\frac{2lK_s \operatorname{stan}\beta}{3(1-s)^2}\xi_s^3 +$$
$$\frac{3l(\mu F_z)^2 \sin\theta \cdot \cos\theta}{5K_\beta}(1-10\xi_s^3+15\xi_s^4-6\xi_s^5)$$

Likewise, the SAT in driving is expressed by the following expression:
[Math. 9]

Math. 9

$$T_{sat} = \frac{l}{2}K_\beta(1+s)\tan\beta \cdot \xi_s^2\left(1-\frac{4}{3}\xi_s\right) - \quad (14)$$
$$\frac{3}{2}l\mu F_z \sin\theta \cdot \xi_s^2(1-\xi_s)^2 + \frac{2}{3}lK_s(1+s)\operatorname{stan}\beta \cdot \xi_s^3 +$$
$$\frac{3l(\mu F_z)^2 \sin\theta \cdot \cos\theta}{5K_\beta}(1-10\xi_s^3+15\xi_s^4-6\xi_s^5)$$

Figure 4:
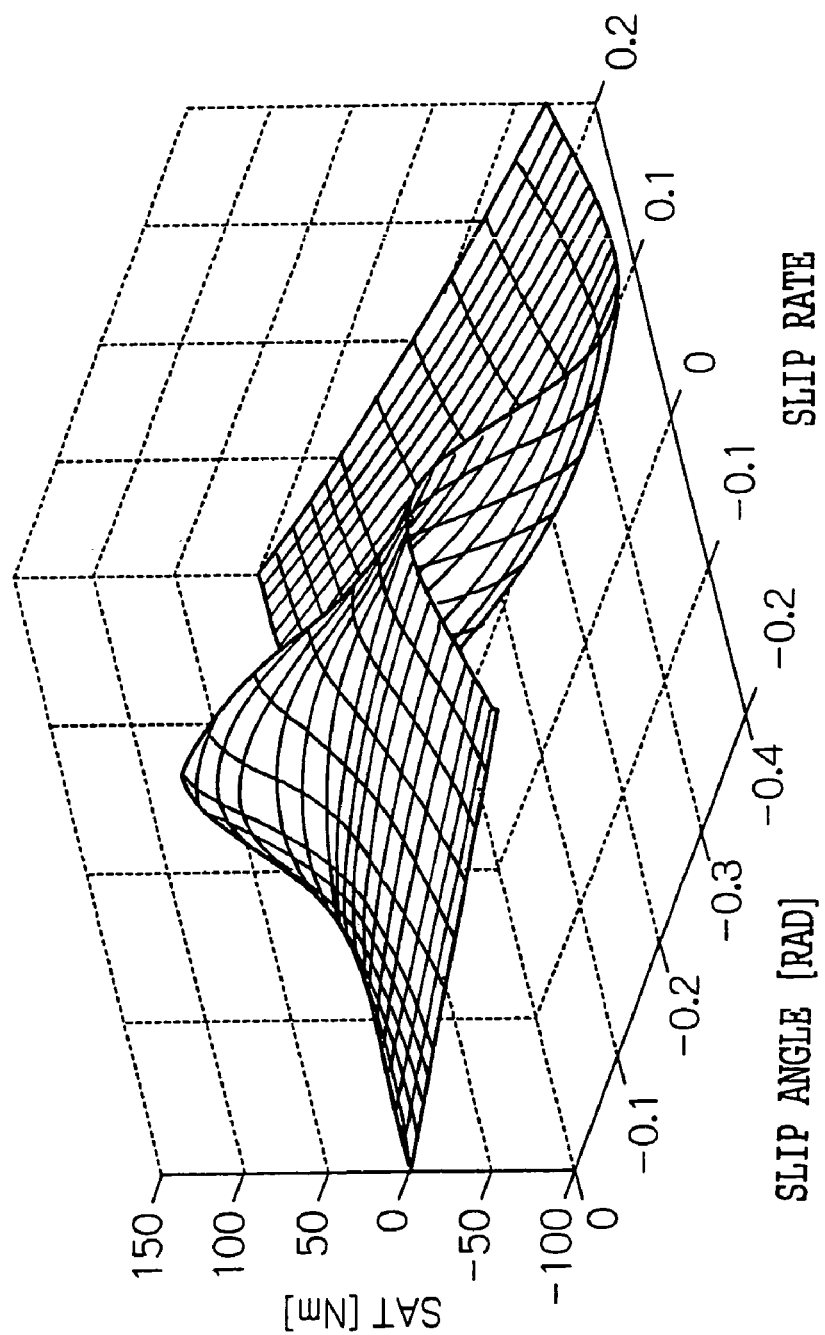
FIG. 4 is a diagram illustrating the SAT characteristic with respect to the slip angle and the slip rate.
Figure 5:
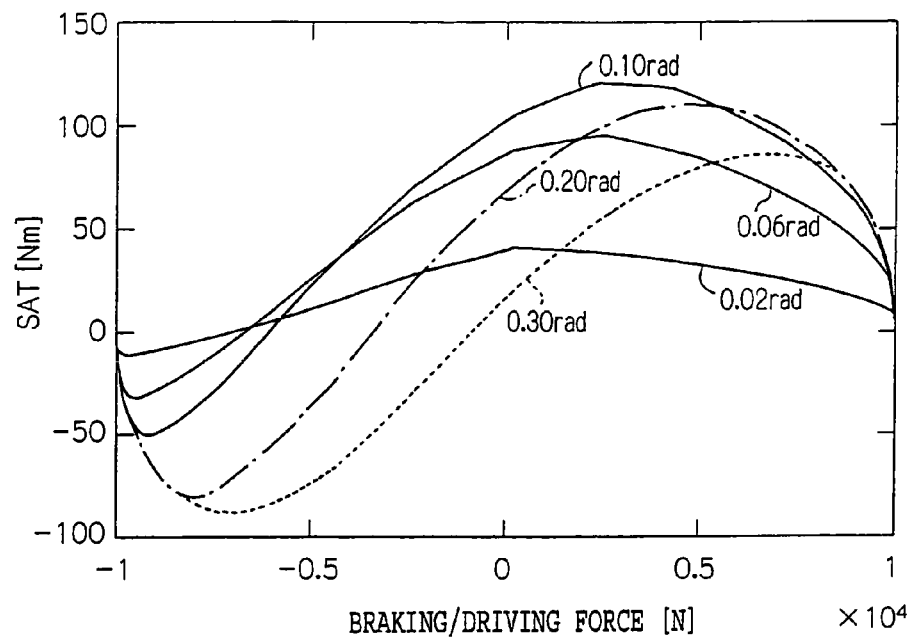
FIG. 5 is a diagram illustrating the relationship between the braking/driving force and the SAT for a given slip angle.

From Eqs. (13) and (14), it can be seen that the SAT in braking/driving is a complicated function of the slip angle and slip rate, and the road surface $\mu$. FIG. 4 and FIG. 5 indicate the result of computation of the SAT from Eqs. (13), (14), and the like. As shown in these FIG. 4 and FIG. 5, it can be seen that the SAT is changed under the influence of the braking/driving, and in the state when the slip angle=0.1 rad, for example, the SAT is first increased with the increase in driving force, but thereafter, is reduced, indicating a non-monotonic, complex characteristic. Thus, a complicated relationship exists between the SAT and the braking/driving force.

On the other hand, when it is considered that the grip level estimation apparatus is to be used with the FF car or applied to the VSC which stabilizes the vehicle motion by active brake control, the expansion of the grip level estimation to the braked/driven state would be indispensable. Therefore, as described below, the present inventor investigated the possibility of estimating the grip level in braking/driving by rearranging the SAT models and noting the relationship between the linear model ratio (the ratio of the SAT to the linear model output) and the grip level (1–µ utilization rate) (these are identical in the non-braked/driven state), and the like for analysis.

First, the braking/driving force to a single tire unit and the SAT around the z axis (the perpendicular direction) of the wheels were investigated. In other words, by replacing the slip rate and the slip angle with the front-rear slip and the lateral slip for description, both of Eqs. (13) and (14) can be expressed as follows:

[Math. 10]

Math. 10

$$T_{sat} = \frac{l}{2}K_s\kappa_y\xi_s^2\left(1 - \frac{4}{3}\xi_s\right) - \frac{3}{2}l\mu F_z\sin\theta \cdot \xi_s^2(1-\xi_s)^2 + \frac{2lK_s^2}{3K_\beta}\kappa_x\kappa_y\xi_s^3 + \frac{3l(\mu F_z)^2\sin\theta \cdot \cos\theta}{5K_\beta}(1 - 10\xi_s^3 + 15\xi_s^4 - 6\xi_s^5) \quad (15)$$

Further, applying Eqs. (10), (11), and (12) to Eq. (15) and arranging, the following expression is obtained.

[Math. 11]

Math. 11

$$T_{sat} = \frac{l}{2}K_s\kappa_y\xi_s^2\left(1 - \frac{4}{3}\xi_s\right) - \frac{l}{2}K_s\kappa_y\xi_s^2(1-\xi_s) + \frac{2lK_s^2}{3K_\beta}\left(-\frac{3F_x}{K_s(1+\xi_s+\xi_s^2)}\right)\kappa_y\xi_s^3 - \frac{l}{5K_\beta} \cdot \frac{K_s\kappa_y}{1-\xi_s} \cdot \frac{F_x}{1-\xi_s^3}(1 - 10\xi_s^3 + 15\xi_s^4 - 6\xi_s^5)$$

$$= \frac{l}{2}K_s\kappa_y\xi_s^2\left(-\frac{1}{3}\xi_s\right) - \frac{2lK_s\kappa_y F_x\xi_s^3}{K_\beta(1+\xi_s+\xi_s^2)} - \frac{lK_s\kappa_y F_x(1 + 2\xi_s + 3\xi_s^2 - 6\xi_s^3)}{5K_\beta(1+\xi_s+\xi_s^2)}$$

$$= -\frac{l}{6}K_s\kappa_y\xi_s^3 - \frac{l}{5}K_s\kappa_y \cdot \frac{F_x}{K_\beta} \cdot \frac{1 + 2\xi_s + 3\xi_s^2 + 4\xi_s^3}{1+\xi_s+\xi_s^2} \quad (16)$$

Now, the grip level (1–µ utilization rate) ε is:

[Math. 12]

Math. 12

$$\epsilon = \xi_s^3 \quad (17)$$

Therefore, by using the lateral slip and braking/driving force and the grip level, the SAT can be finally expressed as follows:

[Math. 13]

Math. 13

$$T_{sat} = -\frac{l}{6}K_s\kappa_y\varepsilon - \frac{l}{5}K_s\kappa_y \cdot \frac{F_x}{K_\beta} \cdot \frac{1 + 2\varepsilon^{1/3} + 3\varepsilon^{2/3} + 4\varepsilon}{1 + \varepsilon^{1/3} + \varepsilon^{2/3}} \quad (18)$$

It has been found that the SAT can be expressed by using the lateral slip and braking/driving force and the grip level. This suggests the possibility of estimation of the grip level when the lateral slip and braking/driving force and the SAT are capable of being detected. Herein, by using the linear model ratio (the ratio of the SAT to the SAT linear model output), which was utilized for analysis in the non-braked/driven state, to arrange the relationship between it and the grip level, the estimation of the grip level will be investigated.

Assuming that the SAT linear model is:
[Math. 14]

Math. 14

$$T_{sato} = -\frac{l}{6}K_s\kappa_y$$

the SAT linear model ratio (the self-aligning torque ratio) γ is:
[Math. 15]

Math. 15

$$\frac{T_{sat}}{T_{sato}} = \frac{T_{sat}}{-\frac{l}{6}K_s\kappa_y} = \gamma \quad (19)$$

and from Eq. (16), it can be seen that the following relationship stands up.
[Math. 16]

Math. 16

$$\gamma = \xi_s^3 + \frac{6F_x}{5K_\beta} \cdot \frac{1 + 2\xi_s + 3\xi_s^2 + 4\xi_s^3}{1+\xi_s+\xi_s^2} \quad (20)$$

Therefore, from the linear model ratio γ and the braking/driving force $F_x$ (or $F_x/K_\beta$), which is a quantity of state in the front-rear direction, the grip level can be derived as follows on the basis of Eq. (20).
[Math. 17]

Math. 17

$$\epsilon = \xi_s^3$$

As described above, the SAT model value $T_{s0}$ can be determined from the lateral slip (slip angle) $\kappa_y$ as a quantity of state in the lateral direction and the above-mentioned stiffness $K_s$ and the grounding length l as tire parameters.

Figure 6:
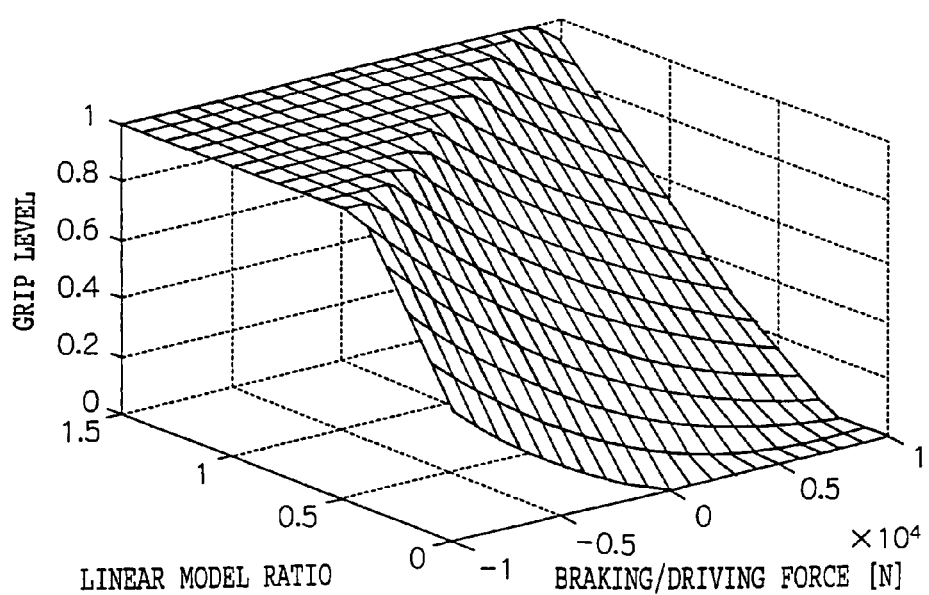
FIG. 6 is a diagram illustrating the relationship among the braking/driving force, the linear model ratio, and the grip level.

FIG. 6 gives a result of solving Eq. (20) for grip level, i.e., determining the grip level from the braking/driving force and the linear model ratio, and showing it as a three-dimensional map. From this figure, it can be seen that there is a monotonic relationship close to a plane between the braking/driving force and linear model ratio, and the grip level, and thus it is expected that the grip level can be estimated with high accuracy.

Next, the caster trail and load variation were considered for investigation.

In other words, it must be considered that the signal which is susceptible to a load variation involved in the braking/driving, and which is used in the grip level estimation is a signal representing the sum of the torques around the king pin for the right and left wheels (the steering wheel axis converted value).

By the way, when the load is changed, the grounding length is increased in proportion to the square root of the load, and the cornering power and the braking stiffness are increased in proportion to the load. In other words, these can be expressed as follows:

[Math. 18]

Math. 18

$$l = l_0 \sqrt{\frac{F_z}{F_{z0}}} \tag{21}$$

$$K_s = K_{s0} \frac{F_z}{F_{z0}} \tag{22}$$

$$K_\beta = K_{\beta 0} \frac{F_z}{F_{z0}} \tag{23}$$

where 0 is the value for the non-braked/driven state.

In addition, the relationship between the SAT around the z axis and the torque around the king pin involves the influences by the caster trail and the king pin offset, and is expressed as follows:

[Math. 19]

Math. 19

$$T_k = T_{sat} + l_c F_y \pm l_k F_x \tag{24}$$

where $T_k$ is torque around king pin; $l_c$ is caster trail; and $l_k$ is king pin offset, and the influence of the king pin offset varies in sign, depending upon the wheel is right-hand or left-hand. Now, assuming that the braking/driving forces of the right-hand and left-hand wheels are identical, the torque $T_s$ transmitted to the steering wheel axis is expressed as follows:

[Math. 20]

Math. 20

$$T_s = -\frac{lK_s}{6g_h}\kappa_y \xi_s^3 - \frac{l_c K_s}{3g_h}\kappa_y(1 + \xi_s + \xi_s^2) - \frac{lK_s}{5g_h}\kappa_y \frac{F_x}{K_\beta} \cdot \frac{1 + 2\xi_s + 3\xi_s^2 + 4\xi_s^3}{1 + \xi_s + \xi_s^2} \tag{25}$$

Herein, however, for the tire stiffness and the front-rear force, the values for the right and left two wheels are newly expressed as $K_s$, $K_\beta$, and $F_x$. In addition, $g_h$ is the steering gear ratio. In this case, the linear model $T_{s0}$ (the steering wheel axis converted value) in consideration of the influences by the changes in grounding length and cornering stiffness due to the load variation is:

[Math. 21]

Math. 21

$$T_{s0} = -\frac{lK_s}{6g_h}\left(1 + \frac{6l_c}{l}\right)\kappa_y \tag{26}$$

therefore, the linear model ratio $\gamma$ is computed as follows:

[Math. 22]

Math. 22

$$\gamma = \frac{l}{l + 6l_c}\xi_s^3 + \frac{2l_c}{l + 6l_c}(1 + \xi_s + \xi_s^2) + \frac{6l}{l + 6l_c}\frac{F_x}{5K_\beta}\frac{1 + 2\xi_s + 3\xi_s^2 + 4\xi_s^3}{1 + \xi_s + \xi_s^2} \tag{27}$$

Therefore, as is the case where investigation is made with a single tire unit, the grip level $\epsilon$ can be derived as follows from the linear model ratio $\gamma$ and the braking/driving force $F_x$ on the basis of Eq. (27), also when investigation is made with the torque around the steering wheel in consideration of the caster trail.

[Math. 23]

Math. 23

$$\epsilon = \xi_s^3$$

As described above, the SAT model value $T_{s0}$ can be determined from the lateral slip (slip angle) $\kappa_y$ as a quantity of state in the lateral direction and the above-mentioned stiffness $K_s$ and the grounding length l as tire parameters.

Figure 7:
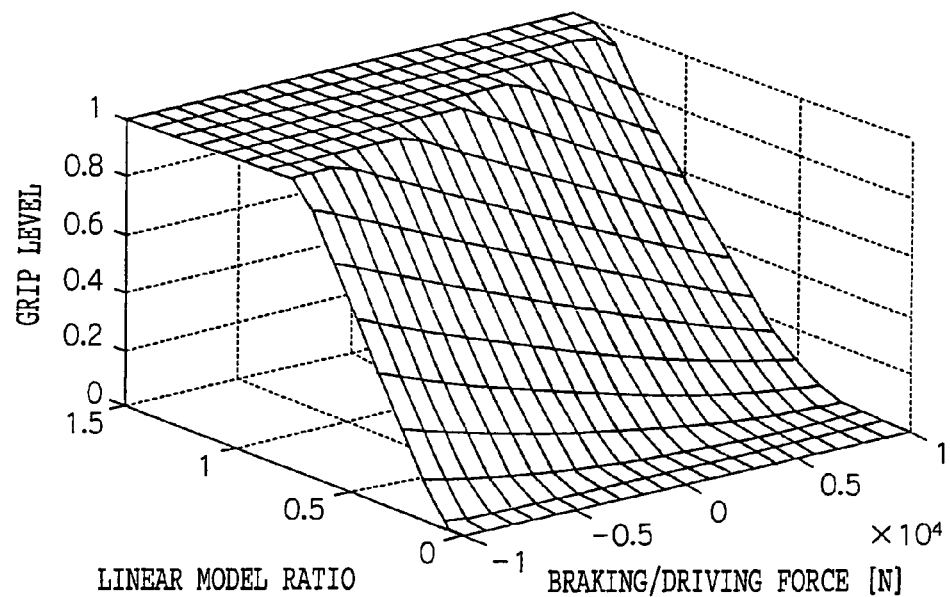
FIG. 7 is a diagram illustrating the relationship among the braking/driving force, the linear model ratio, and the grip level in consideration of the caster trail.

FIG. 7 gives a result of solving Eq. (27) for grip level, i.e., determining the grip level from the braking/driving force and the linear model ratio, and showing it as a three-dimensional map. Comparison of FIG. 7 with FIG. 6 reveals that the existence of the caster trail reduces the effect of the braking/driving force on the grip level.

Next, the function of the grip level estimation apparatus according to the present embodiment based on the above-mentioned principle will be described.

The steering torque detector 12 detects the steering torque provided by the driver through the torque sensor attached to the steering wheel. The assist torque detector 14 computes the assist torque provided by the power steering system by multiplying the current value for the power steering motor by the torque factor.

Figure 8A:
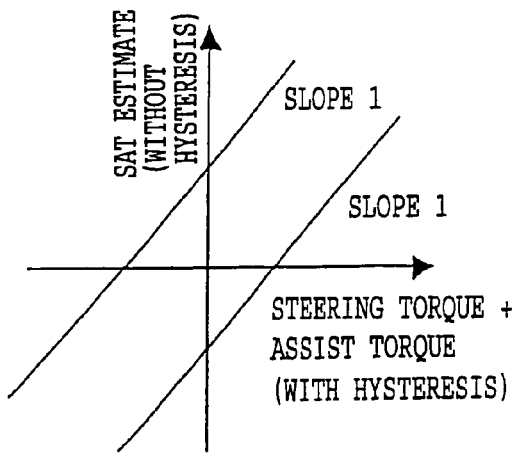
FIG. 8A is a diagram illustrating the upper and lower limits of the SAT estimate.
Figure 8B:
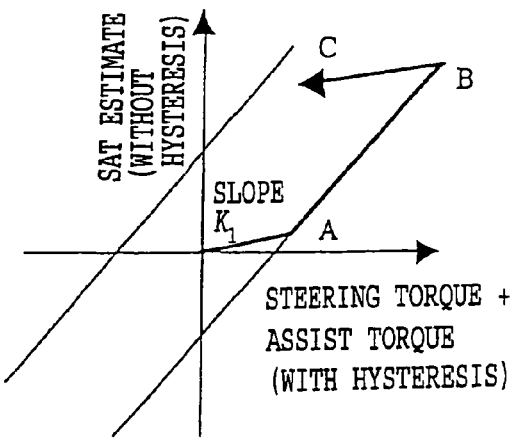
FIG. 8B is a diagram explaining the method of computing the SAT estimate.

The SAT estimator 16 estimates the SAT generated between the road surface and the tire by eliminating the friction in the steering system from the sum of the steering torque and the assist torque. The computation for eliminating the friction is performed by the following logic:

The breadth between the two straight lines as shown in FIG. 8A represents the magnitude of the hysteresis generated by the friction in the steering system, and the slope of the respective straight lines is 1. FIG. 8B shows the method for friction elimination computation. In the straight advancement state where the sum of the steering torque and assist torque, and the slip angle are both 0, the hysteresis characteristic is not generated, and the SAT estimate outputted in this case is 0. Then, when the steering is made and the SAT is generated, the SAT estimate is computed with a slope of $K_1$ for the sum of the steering torque and the assist torque. In the computer, by the discretized logic, the SAT estimate is computed as follows:

[Math. 24]

Math. 24

$$T_{SAT}(k+1) = T_{SAT}(k) + K_1 \cdot (T_{DA}(k+1) - T_{DA}(k)) \tag{28}$$

where $T_{SAT}$ is SAT estimate; and $T_{DA}$ is sum of steering torque and assist torque. The slope $K_1$ is set at a small value, compared to 1, which means that the fluctuation of the SAT estimate is small even if the sum of the steering torque and the assist torque is fluctuated due to the Coulomb friction or the like. When the steering is further made, and the SAT estimate as a result of computation by Eq. (1) reaches the point A in FIG. 8B, the sum of the steering torque and the assist torque being further increased, the SAT estimate is increased in accordance with the following equation along the lower limit of the model.

[Math. 25]

Math. 25

$$T_{SAT}(k+1) = T_{SAT}(k) + T_{DA}(k+1) - T_{DA}(k) \tag{29}$$

When the steering is further made until the point B is reached, turning the steering wheel forth being ended thereat, and the sum of the steering torque and the assist torque starts to be reduced, the SAT estimate is decreased in accordance with Eq. (28) with a slope of $K_1$. In this region, the fluctuation of the SAT estimate is set so as to be small, compared to the fluctuation of the sum of the steering torque and the assist torque. This means that, even if the steering force of the driver is slightly changed in the unsteered state in turning, the SAT estimate is not affected by the Coulomb friction or the like in the power steering system. When, at the point C which is reached with the SAT estimate being decreased from the point B, the sum of the steering torque and the assist torque is again increased, the SAT estimate is increased toward the point B in accordance with Eq. (28). When, from the point C, turning the steering wheel back further reduces the sum of the steering torque and the assist torque until the model upper limit is reached, the SAT estimate is decreased in accordance with Eq. (29) along the upper limit. By setting such two different types of slope, the hysteresis characteristic as shown in FIG. 8B is eliminated.

Figure 9A:
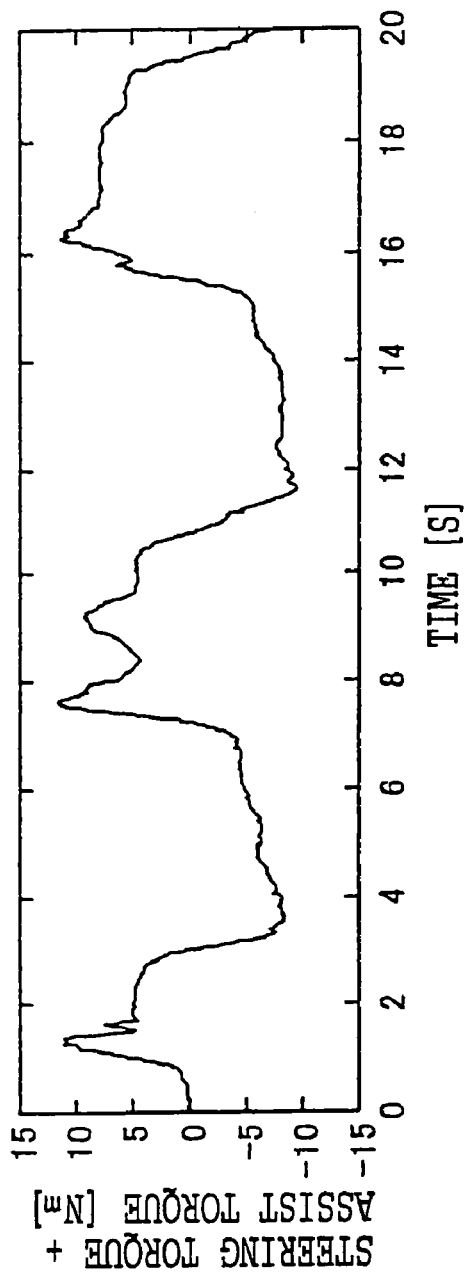
FIG. 9A and FIG. 9B are diagrams explaining the effect of elimination of the hysteresis characteristic.
Figure 9B:
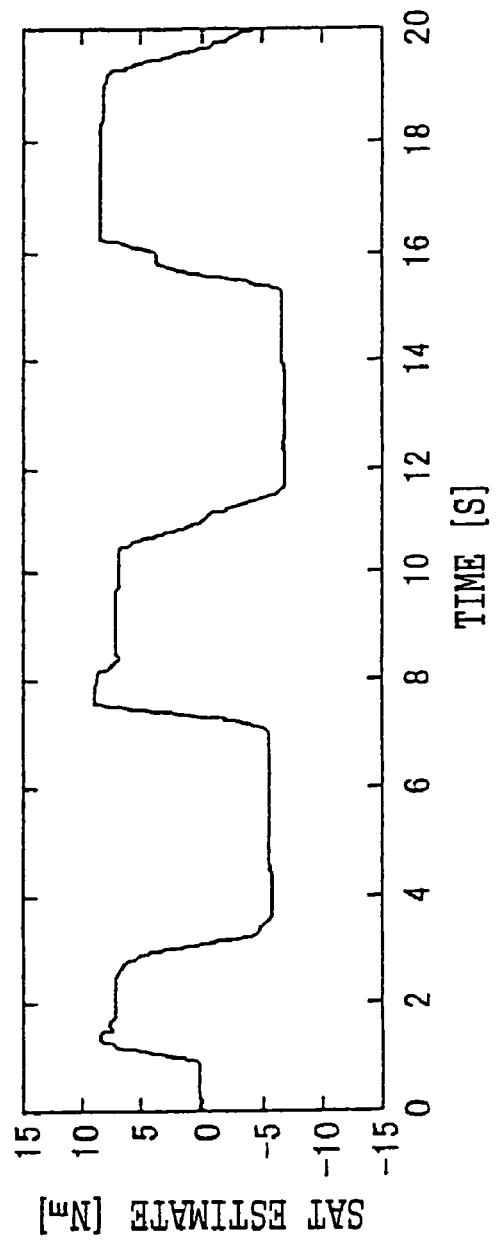

FIG. 9A and FIG. 9B illustrates the sum of the steering torque and the assist torque in running on the high-μ road surface, and the SAT estimate which is as a result of elimination of the hysteresis from that sum on the basis of Eqs. (1) and (2). It can be seen that, by the effect of elimination of the friction, the fluctuation in unsteering that is considered to be caused under the influence of the Coulomb friction and the like is substantially compensated for.

In addition, FIG. 10A and FIG. 10B illustrate the relationship between the slip angle and the sum of the steering torque and the assist torque in running on the high-μ or low-μ road surface, and that between the slip angle and the SAT estimate. It can be seen that the hysteresis characteristic has been eliminated.

Next, the computation of the slip angle by the slip angle arithmetic unit 18 (see FIG. 3) will be described. The slip angle estimator 34 estimates the front wheel slip angle from the vehicle velocity and the steering angle on the basis of the vehicle linear model. Estimation of the front wheel slip angle in the slip angle arithmetic unit 18 is performed with the following equations of state, utilizing the dynamic characteristic of the vehicle motion.

[Math. 26]

Math. 26

$$\frac{d}{dt}\begin{bmatrix} v \\ r \end{bmatrix} = \left( \begin{bmatrix} 0 & -1 \\ 0 & 0 \end{bmatrix} u + \begin{bmatrix} -\frac{c_f+c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix}/u \right)\begin{bmatrix} v \\ r \end{bmatrix} + \begin{bmatrix} \frac{c_f}{Mg_h} \\ \frac{L_f c_f}{I_z g_h} \end{bmatrix}\theta_p \quad (30)$$

$$\alpha_E = \begin{bmatrix} 1 & L_f \end{bmatrix}/u\begin{bmatrix} v \\ r \end{bmatrix} - \frac{\theta_p}{g_h} \quad (31)$$

where v is lateral velocity (m/s); r is yaw rate (rad/s); $\alpha_E$ is front wheel slip angle estimate (rad); u is vehicle velocity (m/s); $C_{f,r}$ is front/rear wheel cornering power (N/rad); $L_{f,r}$ is front/rear axle to center-of-gravity distance (m); M is vehicle mass (kg); $I_z$ is yaw inertia (kgm²); $g_h$ is steering gear ratio; and $\theta_p$ is steering wheel angle. In the present embodiment wherein the front wheel grip level is estimated, the $c_f$ is the same as the above-mentioned $K_\beta$. Discretizing Eqs. (30) and (31) by the sample time τ to express them as functions of the vehicle velocity gives:

[Math. 27]

Math. 27

$$x(k+1) = \left(\begin{bmatrix} 1 & 0 \\ 0 & 1 \end{bmatrix} + \begin{bmatrix} 0 & -\tau \\ 0 & 0 \end{bmatrix}u(k) + \tau A_s/u(k)\right)x(k) + \tau B_s \theta_p(k) \quad (32)$$

$$\alpha_E(k) = \begin{bmatrix} 1 & L_f \end{bmatrix} x(k)/u(k) - \theta_p(k)/g_h \quad (33)$$

where
[Math. 28]

Math. 28

$$A_s = \begin{bmatrix} -\frac{c_f+c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix}, B_s = \begin{bmatrix} \frac{c_f}{Mg_h} \\ \frac{L_f c_f}{I_z g_h} \end{bmatrix}$$

The lateral force arithmetic unit 38 computes the lateral force to the front wheels from the quantities of the vehicle motion states. By transforming the following equations of motion for the vehicle body:
[Math. 29]

Math. 29

$$M\left(\frac{dv}{dt} + ru\right) = F_f + F_r \quad (34)$$

$$I_z\frac{dr}{dt} = L_f F_f - L_r F_r \quad (35)$$

where $F_f$ is front wheel lateral force; and $F_r$ is rear wheel lateral force, the lateral force to the front wheels can be expressed as follows:
[Math. 30]

Math. 30

$$F_f = \frac{L_r M g_y + I_z \frac{dr}{dt}}{L_f + L_r} \quad (36)$$

where
[Math. 31]

Math. 31

$g_y$: Lateral acceleration $\frac{dv}{dt} + ru$

The slip angle converter 18 computes the slip angle converted value for the lateral force computed value by dividing the lateral force computed value by the front wheel cornering power. In other words,
[Math. 32]

Math. 32

$$\alpha_T = -\frac{F_f}{c_f} \quad (37)$$

where $\alpha_T$ is slip angle converted value.

The high-pass filter 36 is constituted as a first-order discrete-time filter. By the way, the continuous-time filter is expressed by the following transfer function:
[Math. 33]

Math. 33

$$G_H(s) = \frac{s}{s + \omega_b} \quad (38)$$

where $\omega_b$ is folding frequency for filter. By using the Tustin transformation or other technique to transform this expression, the discrete-time filter can be designed. If the sampling time is expressed as τ, and the time-advanced operator is z, the Tustin transformation can be executed by substituting the following equation:
[Math. 34]

Math. 34

$$s = \frac{2(z-1)}{\tau(z+1)}$$

into Eq. (38), and the discrete-time filter in this case can be expressed as follows:
[Math. 35]

Math. 35

$$G_H(z) = \frac{2(z-1)}{(\tau\omega_b + 2)z + \tau\omega_b - 2} \quad (39)$$

In addition, the low-pass filter 42 is constituted as a first-order discrete-time filter having the same folding frequency as the high-pass filter 36. The continuous-time filter is expressed as:
[Math. 36]

Math. 36

$$G_L(s) = \frac{\omega_b}{s + \omega_b} \quad (40)$$

and through the Tustin transformation, this is expressed as:
[Math. 37]

Math. 37

$$G_L(z) = \frac{\tau\omega_b(z+1)}{(\tau\omega_b + 2)z + \tau\omega_b - 2} \quad (41)$$

Herein, the sum of the high-pass filter 36 and the low-pass filter 42 which are designed is 1. This means that, when an identical signal is inputted to the high-pass filter 36 and the low-pass filter 42, and the outputs from these are added, the original signal is restored. Herein, by high-pass-filter processing the slip angle estimate including a drift error in the low-frequency region for elimination of the drift error; low-pass-filter processing the slip angle converted value including a noise and a phase lag in the high-frequency region to eliminate the fluctuation components in the high-frequency region, and adding the signals after being processed by these filters, the slip angle which is free from the effects of the drift error, the noise, and the like can be computed. The folding frequency mentioned here is made free from the noise associated with the road surface disturbance that is included in the slip angle converted value, and is set at a value which can accommodate the road surface cant varying velocity in advancing into a bank road, or the like. The slip angles after being high-pass-filter processed and low-pass-filter processed are added to be used as the integrated slip angle for computation of the grip level. In other words,
[Math. 38]

Math. 38

$$\alpha_I(z) = G_H(z) \cdot \alpha_E(z) + G_L(z) \cdot \alpha_T(z) \quad (42)$$

where $\alpha_I$ is integrated slip angle.

The load variation estimator 20 (see FIG. 1) computes for estimation of the grounding load $F_z$ after the change in load on the front wheels as the steered wheels from the front-rear acceleration signal $g_x$ for the vehicle on the basis of the following equation:
[Math. 39]

Math. 39

$$F_z = F_{z0} - \frac{hM}{L_f + L_r} g_x \quad (43)$$

where h is center-of-gravity height; and $F_{z0}$ is static load on front wheels, being expressed as:
[Math. 40]

Math. 40

$$F_{z0} = \frac{L_r M g}{L_f + L_r} \quad (44)$$

The SAT model value arithmetic unit 22 computes the linear model output for the SAT, i.e., the SAT model value on the basis of Eqs. (21) to (23) and Eq. (26) by multiplying the slip angle by the origin slope with respect to the slip angle for the SAT from the integrated slip angle and the grounding load after the load variation.

The SAT model ratio arithmetic unit 28 (see FIG. 2) in the grip level estimator 26 computes the ratio of the SAT estimate to the SAT model value as the SAT model ratio from the SAT estimate and the SAT model value. The grip level map is a three-dimensional map for outputting a grip level from the SAT model ratio and the braking/driving force as shown in FIG. 7, featuring that the grip level monotonically increases with respect to the SAT model ratio and monotonically decreases with respect to the braking/driving force (the driving force being assumed to be positive).

Figure 11:
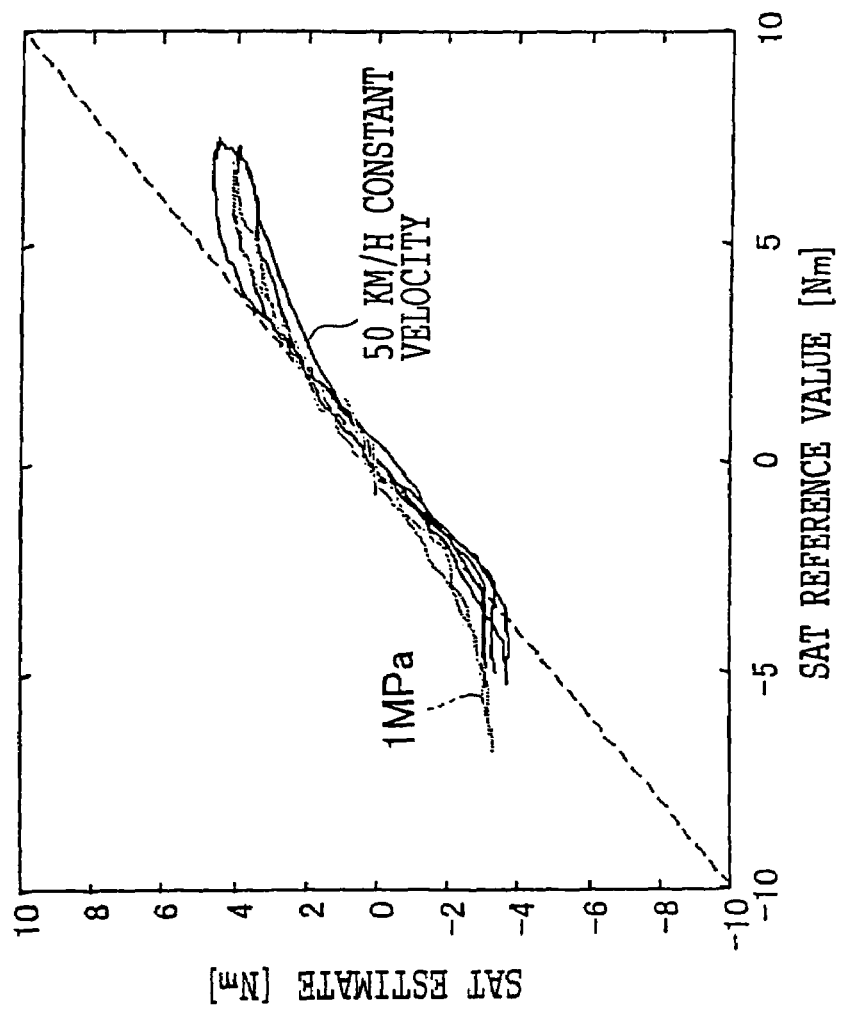
FIG. 11 is a diagram explaining the effect of the braking on the SAT estimate.

FIG. 11 compares the SAT linear model values (computed from the integrated slip angle) in braking and non-braking on the low-μ road with the SAT estimate. It can be verified that the SAT estimate is decreased with the braking.

FIG. 12A to FIG. 12C compare the grip level estimate with the true value in braking on the low-μ road. The grip level true value is a value computed on the assumption that the road surface μ is constant (0.35), and by regarding that "grip level true value=1−μ utilization rate=1−actual result μ value/road surface μ", from the actual result μ obtained by normalizing the front-rear force and the lateral force generated in the front wheels by the load. The grip level estimate is a value computed from the braking force and the linear model ratio on the basis of the map as shown in FIG. 6. From these figures, it can be seen that the grip level estimation has been exactly performed for both the non-braking time period before 1.7 s and the braking time period after 1.7 s.

In the present embodiment, the grip level for the steered wheels on the basis of the self-aligning torque ratio and the braking/driving force estimated by the braking/driving force estimator, and thus the grip level when the vehicle is in the braked/driven state can be estimated with high accuracy.

In addition, in the present embodiment, the grounding length and the stiffness of the steered wheels are determined on the basis of the condition of load on the steered wheels for computation of the self-aligning torque model value in order to estimate the grip level for the steered wheels, and thus the grip level when the vehicle is in the braked/driven state can be estimated with high accuracy.

In the above-described embodiment, the grounding length and the stiffness of the steered wheels are determined on the basis of the condition of load on the steered wheels for computation of the self-aligning torque model value (Eqs. (21) to (23) and Eq. (26)), however, the present invention is not limited to this, but the grounding length and the stiffness of the steered wheels may be adapted to be predetermined values for computation of the self-aligning torque model value (Eq. (19) and the like) In this case, the load variation estimator 20 may be omitted.

Second Embodiment

Next, a second embodiment of the present invention will be described. In the above-described first embodiment, the grip level is estimated from the steering torque for the front right and left two wheels with the steered wheels being assumed to be the front two wheels, however, in the present embodiment, the grip level is estimated for each of the wheels. The configuration in the present embodiment is the same as that in the above-described first embodiment, thus description thereof is omitted.

First, the principle of estimation of the grip level for each of the wheels in the present embodiment will be described.

When the grip level is to be estimated from the steering torque for the right and left two wheels, the torque based on the king pin offset that acts on the right and left wheels has been canceled, thus there has been no need for the influence thereof in estimating the grip level. However, when the SAT is to be estimated for each of the wheels, and from this SAT and the slip angle, the grip level for each of the wheels is to be estimated, there arises the need for eliminating the influence of the torque based on the king pin offset. In other words, between the SAT around the z axis derived in the brush model and the torque around the king pin, the following relational expression is given:

[Math. 41]

Math. 41

$$T_k = T_{sat} + l_c F_y \pm l_k F_x \quad (101)$$

where $T_k$ is torque around king pin; $I_c$ is caster trail; and $l_k$ is king pin offset, and assuming that the king pin offset and the braking/driving force are known, the third term on the right-hand side in Eq. (101) can be removed. In other words, the torque $T_{kc}$ around the king pin that is made free from the influence of the torque based on the king pin offset can be expressed as follows:

[Math. 42]

Math. 42

$$\begin{aligned} T_{kc} &= T_k \mp l_k F \\ &= T_{sat} + l_c F_y \\ &= -\frac{lK_s}{6}\kappa_y \xi_s^3 - \frac{l_c K_s}{3}\kappa_y (1 + \xi_s + \xi_s^2) - \\ &\quad \frac{lK_s}{5}\kappa_y \frac{F_x}{K_\beta} \cdot \frac{1 + 2\xi_s + 3\xi_s^2 + 4\xi_s^3}{1 + \xi_s + \xi_s^2} \end{aligned} \quad (102)$$

The grounding length, the cornering power, and the braking stiffness are expressed as functions of the load as follows:

[Math. 43]

Math. 43

$$l = l_0 \sqrt{\frac{F_z}{F_{z0}}} \quad (103)$$

$$K_s = K_{s0} \frac{F_z}{F_{z0}} \quad (104)$$

$$K_\beta = K_{\beta0} \frac{F_z}{F_{z0}} \quad (105)$$

where 0 indicates the value is that in the static load condition. Now, assuming that the SAT model value $T_{s0}$ which considers the influence of the changes in grounding length and cornering stiffness due to the load variation is:

[Math. 44]

Math. 44

$$T_{k0} = -\frac{lK_s}{6}\left(1 + \frac{6l_c}{l}\right)\kappa_y \quad (106)$$

the linear model ratio γ is computed as follows:

[Math. 45]

Math. 45

$$\gamma = \frac{l}{l + 6l_c}\xi_s^3 + \frac{2l_c}{l + 6l_c}(1 + \xi_s + \xi_s^2) + \quad (107)$$
$$\frac{6l}{l + 6l_c}\frac{F_x}{5K_\beta}\frac{1 + 2\xi_s + 3\xi_s^2 + 4\xi_s^3}{1 + \xi_s + \xi_s^2}$$

Therefore, also when the grip level ε is considered for each of the wheels, it can be derived as follows from the linear model ratio γ and the braking/driving force $F_x$ on the basis of Eq. (107):

[Math. 46]

Math. 46

$$\epsilon = \xi_s^3$$

As described above, the SAT model value $T_{s0}$ can be determined from the lateral slip (slip angle) $\kappa_y$ as a quantity of state in the lateral direction, the above-mentioned stiffness $K_s$ and grounding length l as tire parameters.

Next, the function in the present embodiment will be described.

The SAT estimator 16 multiplies the output of a strain gage attached to the tie rod part of the steered wheels, i.e., the tie rod axis force by the knuckle arm length to compute the torque around the king pin and outputs it as the SAT estimate.

The slip angle estimator 34 in the slip angle arithmetic unit 18 estimates the front/rear wheel slip angle from the vehicle velocity and the actual steered angle for the front/rear wheels on the basis of the vehicle linear model. Estimation of the front wheel slip angle in the slip angle arithmetic unit 18 is performed with the following equations of state, utilizing the dynamic characteristic of the vehicle motion.

[Math. 47]

Math. 47

$$\frac{d}{dt}\begin{bmatrix} v \\ r \end{bmatrix} = \left( \begin{bmatrix} 0 & -1 \\ 0 & 0 \end{bmatrix} u + \begin{bmatrix} -\frac{c_f+c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix} / u \right) \begin{bmatrix} v \\ r \end{bmatrix} + \begin{bmatrix} \frac{c_f}{M} & \frac{c_r}{M} \\ \frac{L_f c_f}{I_z} & -\frac{L_r c_r}{I_z} \end{bmatrix} \begin{bmatrix} \theta_f \\ \theta_r \end{bmatrix} \quad (108)$$

$$\alpha_{fE} = \begin{bmatrix} 1 & L_f \end{bmatrix} / u \begin{bmatrix} v \\ r \end{bmatrix} - \theta_f \quad (109)$$

$$\alpha_{rE} = \begin{bmatrix} 1 & -L_r \end{bmatrix} / u \begin{bmatrix} v \\ r \end{bmatrix} - \theta_r \quad (110)$$

where v is lateral velocity (m/s); r is yaw rate (rad/s); $\alpha_{fE}$ is front wheel slip angle estimate (rad); $\alpha_{rE}$ is rear wheel slip angle estimate (rad); u is vehicle velocity (m/s); $c_{f,r}$ is front/rear wheel cornering power (N/rad); $L_{f,r}$ is front/rear axle to center-of-gravity distance (m); M is vehicle mass (kg); $I_z$ is yaw inertia (kgm$^2$); $\theta_f$ is front wheel actual steered angle; and $\theta_r$ is rear wheel actual steered angle. Discretizing Eqs. (108), (109), and (110) by the sample time τ to express them as functions of the vehicle velocity gives:

[Math. 48]

Math. 48

$$x(k+1) = \left( \begin{bmatrix} 1 & 0 \\ 0 & 1 \end{bmatrix} + \begin{bmatrix} 0 & -\tau \\ 0 & 0 \end{bmatrix} u(k) + \tau A_s / u(k) \right) x(k) + \tau B_s \begin{bmatrix} \theta_f(k) \\ \theta_r(k) \end{bmatrix} \quad (111)$$

$$\alpha_{fE}(k) = \begin{bmatrix} 1 & L_f \end{bmatrix} x(k)/u(k) - \theta_f(k) \quad (112)$$

$$\alpha_{rE}(k) = \begin{bmatrix} 1 & -L_r \end{bmatrix} x(k)/u(k) - \theta_r(k) \quad (113)$$

where

[Math. 49]

Math. 49

$$A_s = \begin{bmatrix} -\frac{c_f+c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix}, B_s = \begin{bmatrix} \frac{c_f}{M} & \frac{c_r}{M} \\ \frac{L_f c_f}{I_z} & -\frac{L_r c_r}{I_z} \end{bmatrix}$$

The lateral force arithmetic unit 38 computes the lateral force to the right and left two wheels in the front/rear wheels from the quantities of the vehicle motion states. By transforming the following equations of motion for the vehicle body:

[Math. 50]

Math. 50

$$M\left(\frac{dv}{dt} + ru\right) = F_f + F_r \quad (114)$$

$$I_z \frac{dr}{dt} = L_f F_f - L_r F_r \quad (115)$$

where $F_f$ is front wheel lateral force (lateral force to front two wheels); and $F_r$ is rear wheel lateral force (lateral force to rear two wheels), the lateral force to the front/rear wheels can be expressed as follows:

[Math. 51]

Math. 51

$$F_f = \frac{L_r M g_y + I_z \frac{dr}{dt}}{L_f + L_r} \quad (116)$$

$$F_r = \frac{L_r M g_y - I_z \frac{dr}{dt}}{L_f + L_r} \quad (117)$$

where

[Math. 52]

Math. 52

$g_y$: Lateral acceleration $\frac{dv}{dt} + ru$

The slip angle converter 40 computes the slip angle converted value for the lateral force computed value by dividing the lateral force computed value by the front wheel cornering power. In other words,

[Math. 53]

Math. 53

$$\alpha_{fT} = -\frac{F_f}{c_f} \quad (118)$$

$$\alpha_{rT} = -\frac{F_r}{c_r} \quad (119)$$

where $\alpha_{fT}$ is front wheel slip angle converted value; and $\alpha_{rT}$ is rear wheel slip angle converted value.

The high-pass filter 36 is constituted as a first-order discrete-time filter. By the way, the continuous-time filter is expressed by the following transfer function:

[Math. 54]

Math. 54

$$G_H(s) = \frac{s}{s + \omega_b} \quad (120)$$

where $\omega_b$ is folding frequency for filter. By using the Tustin transformation or other technique to transform this expression, the discrete-time filter can be designed. If the sampling time is expressed as τ, and the time-advanced operator is z, the Tustin transformation can be executed by substituting the following equation:

[Math. 55]

Math. 55

$$s = \frac{2(z-1)}{\tau(z+1)}$$

into Eq. (120), and the discrete-time filter in this case can be expressed as follows:

[Math. 56]

Math. 56

$$G_H(z) = \frac{2(z-1)}{(\tau\omega_b + 2)z + \tau\omega_b - 2} \quad (121)$$

In addition, the low-pass filter 42 is constituted as a first-order discrete-time filter having the same folding frequency as the high-pass filter 36. The continuous-time filter is expressed as:

[Math. 57]

Math. 57

$$G_L(s) = \frac{\omega_b}{s + \omega_b} \quad (122)$$

and being Tustin-transformed, this is expressed as:

[Math. 58]

Math. 58

$$G_L(z) = \frac{\tau\omega_b(z+1)}{(\tau\omega_b + 2)z + \tau\omega_b - 2} \quad (123)$$

The sum of the high-pass filter 36 and the low-pass filter 42 which are designed here is 1. This means that, when an identical signal is inputted to the high-pass filter and the low-pass filter, and the outputs from these are added, the original signal is restored. Herein, by high-pass-filter processing the slip angle estimate including a drift error in the low-frequency region for elimination of the drift error; low-pass-filter processing the slip angle converted value including a noise and a phase lag in the high-frequency region to eliminate the fluctuation components in the high-frequency region, and adding the signals after being processed by these filters, the slip angle which is free from the effects of the drift error, the noise, and the like can be computed. The folding frequency mentioned here is rendered free from the noise associated with the road surface disturbance that is included in the slip angle converted value, and is set at a value which can accommodate the road surface cant varying velocity in advancing into a bank road, or the like. The slip angles after being high-pass-filter processed and low-pass-filter processed are added to be used as the integrated slip angle for computation of the grip level. In other words,

[Math. 59]

Math. 59

$$\alpha_{fI}(z) = G_H(z) \cdot \alpha_{fE}(z) + G_L(z) \cdot \alpha_{fT}(z) \quad (124)$$

$$\alpha_{rI}(z) = G_H(z) \cdot \alpha_{rE}(z) + G_L(z) \cdot \alpha_{rT}(z) \quad (125)$$

where $\alpha_{fI}$ is front wheel integrated slip angle, and $\alpha_{rI}$ is rear wheel integrated slip angle. In the present embodiment, the slip angle for the front two wheels and that for the rear two wheels have been derived on the assumption that the slip angles for the right and left wheels are identical, however, the slip angle can be estimated for the respective four wheels in consideration of the difference in position between the right and left wheels.

The load variation estimator 20 estimates the grounding load $F_{zi}$ (i=1, 2, 3, 4, where 1 is the front left wheel, 2 is the front right wheel, 3 is the rear left wheel, and 4 is the rear right wheel) after the change in load on the respective wheels from the front-rear acceleration signal $g_x$ for the vehicle, and the lateral acceleration signal $g_y$ for the vehicle on the basis of the following equations. Assuming that the load variation from the static load on the respective wheels:

[Math. 60]

Math. 60

$$F_{z10} = F_{z20} = \frac{L_r M g}{L_f + L_r} \quad (126)$$

$$F_{z30} = F_{z40} = \frac{L_f M g}{L_f + L_r} \quad (127)$$

is $\Delta F_{zi}$, the following relations exist from the balance of the vehicle body attitude.

[Math. 61]

Math. 61

$$\Delta F_1 + \Delta F_2 + \Delta F_3 + \Delta F_4 = 0 \quad (128)$$

$$-L_f(\Delta F_1 + \Delta F_2) + L_r(\Delta F_3 + \Delta F_4) = hMg_x \quad (129)$$

$$-\frac{T_f}{2}(\Delta F_1 - \Delta F_2) - \frac{T_r}{2}(\Delta F_3 - \Delta F_4) = hMg_y \quad (130)$$

$$\frac{T_f}{2}(\Delta F_1 - \Delta F_2) : \frac{T_r}{2}(\Delta F_3 - \Delta F_4) = \gamma_{roll} : 1 - \gamma_{roll} \quad (131)$$

where h is center-of-gravity height; $\gamma_{roll}$ is roll stiffness distribution (front wheel loading rate); $T_f$ is front wheel tread; and $T_r$ is rear wheel tread. Therefore, by solving Eqs. (128) to (131), the load variation for the respective wheels can be determined as follows:

[Math. 62]

Math. 62

$$\begin{bmatrix} \Delta F_1 \\ \Delta F_2 \\ \Delta F_3 \\ \Delta F_4 \end{bmatrix} = \begin{bmatrix} 1 & 1 & 1 & 1 \\ -L_f & -L_f & L_r & L_r \\ -T_f & T_f & -T_r & T_r \\ (1-\gamma_{roll})T_f & -(1-\gamma_{roll})T_f & -\gamma_{roll}T_r & \gamma_{roll}T_r \end{bmatrix}^{-1} \begin{bmatrix} 0 \\ hMg_x \\ 2hMg_y \\ 0 \end{bmatrix} \quad (132)$$

The SAT model value arithmetic unit 22 computes the linear model output for the SAT, i.e., the SAT model value $T_{k0}$ on the basis of Eqs. (103) to (106) by multiplying the slip angle by the origin slope with respect to the slip angle for the SAT from the integrated slip angle and the grounding load after the load variation.

The SAT model ratio arithmetic unit 28 in the grip level estimator 26 eliminates the influence of the torque based on the king pin offset from the SAT estimate $T_k$, which is the torque around the king pin, utilizing the braking/driving force as shown in Eq. (102), and computes the ratio of the SAT estimate $T_{k0}$, which is rendered free from the influence of the torque based on the king pin offset, to the SAT model value $T_{s0}$ as the SAT model ratio.

The grip level map is a three-dimensional map for outputting a grip level from the SAT model ratio and the braking/driving force, featuring that the grip level monotonically increases with respect to the SAT model ratio and monotonically decreases with respect to the braking/driving force (the driving force being assumed to be positive).

In the present embodiment, a four-wheel steered vehicle with which the right and left wheels are steered at the same angle has been mentioned, however, by computing for estimation of the slip angle for the respective wheels, or the like, the present art can be applied to a vehicle which four wheels are individually steered. In addition, by attaching a strain gage to a plurality of suspension links to which the rear wheels are mounted, and estimating the torque around the z axis that is generated in the rear wheels, the present art can be applied to a vehicle which has no steering mechanism for the rear wheels.

Third Embodiment

Next, a third embodiment will be described.

Figure 13:
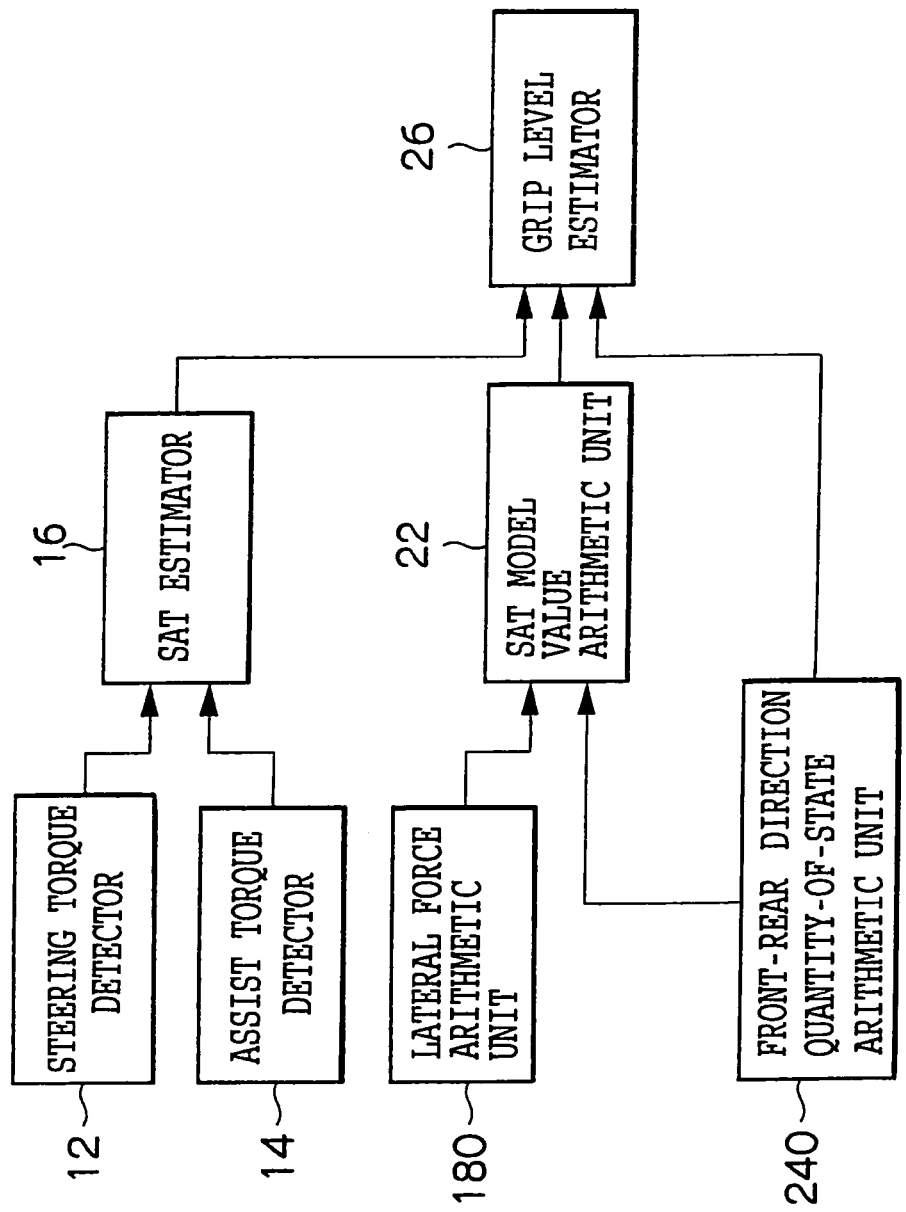
FIG. 13 is a block diagram for a grip level estimation apparatus according to a third embodiment.

As shown in FIG. 13, a grip level estimation apparatus according to the present embodiment has the same parts of the configuration as those of the above-described first embodiment (see FIG. 1), thus the same parts are provided with the same sign, the description thereof being omitted, and the different parts will be described. In other words, the grip level estimation apparatus according to the present embodiment comprises a lateral force detector 180 in place of the slip angle arithmetic unit 18, not comprising a load variation estimator 20, and comprises a front-rear direction quantity-of-state arithmetic unit 240, and the front-rear direction quantity-of-state arithmetic unit 240 is connected not only to the grip level estimator 26, but also to the SAT model value arithmetic unit 22. The lateral force detector 180 can be configured with a computer.

Figure 14:
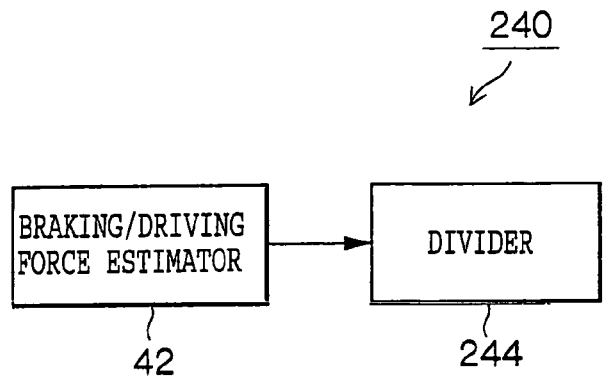
FIG. 14 is a block diagram for a front-rear direction quantity-of-state arithmetic unit.

As shown in FIG. 14, the front-rear direction quantity-of-state arithmetic unit 240 is configured to comprise a braking/driving force estimator 42 which estimates the braking/driving force on the basis of the engine output and the braking hydraulic power; and a divider 244 which computes the front-rear direction quantity of state ($F_x/K_\beta$) by dividing the braking/driving force outputted from the braking/driving force estimator 42 by the front wheel cornering power. The braking/driving force estimator 42 and the divider 244 can be configured with a computer.

Next, the principle of computation of the grip level in braking/driving according to the present embodiment will be described.

First, the lateral force is expressed as follows:
[Math. 63]

Math. 63

$$F_y = -\frac{1+\xi_s+\xi_s^2}{3} K_s \kappa_y \quad (201)$$

and using this lateral force, Eq. (16) is expressed as follows:
[Math. 64]

Math. 64

$$T_{sat} = \left\{ \frac{l}{2} \cdot \frac{\xi_s^3}{1+\xi_s+\xi_s^2} + \frac{3l}{5} \cdot \frac{F_x}{K_\beta} \cdot \frac{1+2\xi_s+3\xi_s^2+4\xi_s^3}{(1+\xi_s+\xi_s^2)^2} \right\} F_y \quad (202)$$

The relationship between the SAT around the z axis and the torque around the king pin involves the influences by the caster trail and the king pin offset, and is expressed as follows:
[Math. 65]

Math. 65

$$T_k = T_{sat} + l_c F_y \pm l_k F_x \quad (203)$$

where $T_k$ is torque around king pin; $l_c$ is caster trail; and $l_k$ is king pin offset, and the influence of the king pin offset varies in sign, depending upon the wheel is right-hand or left-hand. Now, assuming that the braking/driving forces of the right-hand and left-hand wheels are identical, the torque $T_s$ transmitted to the steering wheel axis is expressed as follows:
[Math. 66]

Math. 66

$$T_S = \left\{ \frac{l}{2g_h} \cdot \frac{\xi_s^3}{1+\xi_s+\xi_s^2} + \frac{l_c}{8_h} + \frac{3l}{5g_h} \cdot \frac{F_x}{K_\beta} \cdot \frac{1+2\xi_s+3\xi_s^2+4\xi_s^3}{(1+\xi_s+\xi_s^2)^2} \right\} F_y \quad (204)$$

where $g_h$ is steering gear ratio, and the braking/driving force, and the lateral force to the front right and left two wheels, which will be discussed in the subsequent description, are expressed as $F_x$ and $F_y$. Herein, it has been assumed that the braking/driving forces of the right-hand and left-hand wheels are identical, however, when there arises a difference in braking/driving force between the right-hand and left-hand wheels, the torque which is generated by the difference in braking/driving force can be previously compensated for in order to derive the steering wheel torque in Eq. (204) as the steering wheel torque after compensation for the difference in braking/driving force. In addition, herein, the steering wheel torque including the torque generated by the caster trail has been derived, however, the torque generated by the caster trail is in proportion to the lateral force, and the value thereof can be estimated regardless of the state of the grip. Therefore, the torque for the caster trail may be previously compensated for. In this case, the steering wheel torque $T_{sc}$ after compensation for the caster trail can be expressed as follows:
[Math. 67]

Math. 67

$$T_{sc} = \left\{ \frac{l}{2g_h} \cdot \frac{\xi_s^3}{1+\xi_s+\xi_s^2} + \frac{3l}{5g_h} \cdot \frac{F_x}{K_\beta} \cdot \frac{1+2\xi_s+3\xi_s^2+4\xi_s^3}{(1+\xi_s+\xi_s^2)^2} \right\} F_y \quad (205)$$

In addition, herein, the value when it is assumed that the grip level=1 in Eq. (204), i.e.,
[Math. 68]

Math. 68

$$T_{s0} = \left\{ \frac{l}{6g_h} + \frac{l_c}{8_h} + \frac{2l}{3g_h} \cdot \frac{F_x}{K_\beta} \right\} F_y \quad (206)$$

is to be the SAT model value. Now, assuming that the ratio between Eq. (204) and Eq. (206) is the SAT model ratio γ, i.e.,
[Math. 69]

Math. 69

$$\gamma = \frac{T_s}{T_{s0}} \quad (207)$$

the following relationship stands up.

[Math. 70]

Math. 70

$$\left(\frac{l}{6} + l_c + \frac{2l}{3}\frac{F_x}{K_\beta}\right)\gamma(1 + \xi_s + \xi_s^2)^2 = \frac{l}{2}\xi_s^3(1 + \xi_s + \xi_s^2) + \quad (208)$$
$$l_c(1 + \xi_s + \xi_s^2)^2 +$$
$$\frac{3l}{5} \cdot \frac{F_x}{K_\beta} \cdot$$
$$(1 + 2\xi_s + 3\xi_s^2 + 4\xi_s^3)$$

Therefore, by utilizing the relationship in Eq. (208), the grip level ε can be derived from the SAT model ratio γ and $F_x/K_\beta$ as follows:

[Math. 71]

Math. 71

$$\epsilon = \xi_s^3$$

As described above, the SAT model value can be determined using the lateral force $F_y$ as the lateral direction quantity of state and the front-rear direction quantity of state ($F_x/K_\beta$)

Figure 15:
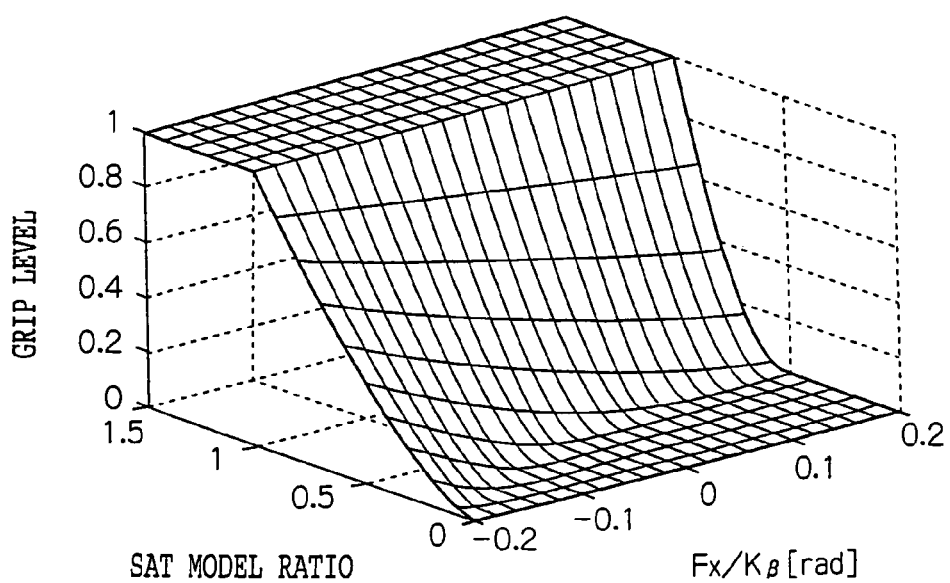
FIG. 15 is a three-dimensional map of grip level ϵ, the SAT model ratio γ, and the $F_x/K_\beta$.

FIG. 15 gives a result of solving Eq. (208) for grip level $\epsilon=\xi_s^3$ as a three-dimensional map for the SAT model ratio γ and $F_x/K_\beta$. If such a three-dimensional map is previously had, there is no need for solving Eq. (208), and the grip level can be easily determined from γ and $F_x/K_\beta$. In addition, this map features that the grip level monotonically increases with respect to the SAT model ratio and monotonically decreases with respect to the $F_x/K_\beta$, and further that the slope for the monotonic decrease with respect to the $F_x/K_\beta$ is reduced as the SAT model ratio is increased, and when the SAT model ratio is 1, the slope=0, i.e., the grip level will neither increase nor decrease. In addition, if the change with respect to the $F_x/K_\beta$ is neglected, the grip level can be approximately estimated only from the SAT model ratio by utilizing the value on the axis of $F_x/K_\beta=0$ in FIG. 15.

Next, the function of the grip level estimation apparatus according to the present embodiment on the above-described principle will be described.

As described above, the steering torque detector 12 detects the steering torque provided by the driver, the assist torque detector 14 computes the assist torque, the SAT estimator 16 estimates the torque $T_s$ transmitted to the steering wheel axis from the sum of the steering torque and the assist torque on the basis of Eq. (204). The lateral force detector 180 detects the lateral force.

The braking/driving force estimator 42 in the front-rear direction quantity-of-state arithmetic unit 240 estimates the braking/driving force on the basis of the engine output and the braking hydraulic power; and the divider 244 computes the front-rear direction quantity of state ($F_x/K_\beta$) by dividing the braking/driving force outputted from the braking/driving force estimator 42 by the front wheel cornering power.

The SAT model value arithmetic unit 22 computes the SAT model value $T_{s0}$ from the above equation (206), using the front-rear direction quantity of state ($F_x/K_\beta$) outputted from the front-rear direction quantity-of-state arithmetic unit 240, the lateral force $F_y$ detected by the lateral force detector 180, the steering gear ratio $g_h$, the caster trail $l_c$, and the grounding length l.

The grip level estimator 26 according to the present embodiment computes the SAT model ratio γ, which is the ratio between the torque $T_s$ (Eq. (204)) estimated by the SAT estimator 16 and the SAT model value $T_{s0}$ (Eq. (206)) estimated by the SAT model value arithmetic unit 22, from the above equation (207).

And, the grip level estimator 26 estimates the grip level $\epsilon=\xi_s^3$ from the above-mentioned map (see FIG. 15) using the computed SAT model ratio γ and the front-rear direction quantity of state ($F_x/K_\beta$) outputted from the front-rear direction quantity-of-state arithmetic unit 240. Instead of the map, the data table or the relational expression may be stored for use.

By the way, in the above-described embodiment, the grip level is estimated using the steering wheel torque $T_s$ before the compensation for the caster trail, however, the present invention is not limited to this, but the steering wheel torque $T_{s0}$ after compensation for the caster trail may be utilized for estimation. In this case, the value when it is assumed that the grip level=1 in Eq. (205), which describes the steering wheel torque after compensation for the caster trail, i.e.,

[Math. 72]

Math. 72

$$T_{sc0} = \left\{\frac{l}{6g_h} + \frac{2l}{3g_h} \cdot \frac{F_x}{K_\beta}\right\}F_y \quad (209)$$

is to be the SAT model value. Now, assuming that the ratio between Eq. (205) and Eq. (209) is the SAT model ratio γ, i.e.,

[Math. 73]

Math. 73

$$\gamma = \frac{T_{sc}}{T_{sc0}} \quad (210)$$

the following relationship stands up.

[Math. 74]

Math. 74

$$\left(\frac{1}{6} + \frac{2}{3}\frac{F_x}{K_\beta}\right)\gamma(1 + \xi_s + \xi_s^2)^2 = \frac{1}{2}\xi_s^3(1 + \xi_s + \xi_s^2) + \frac{3}{5} \cdot \frac{F_x}{K_\beta} \cdot \quad (211)$$
$$(1 + 2\xi_s + 3\xi_s^2 + 4\xi_s^3)$$

Therefore, also in this case, by utilizing the relationship in Eq. (211), the grip level can be derived from the SAT model ratio γ and $F_x/K_\beta$.

Figure 16:
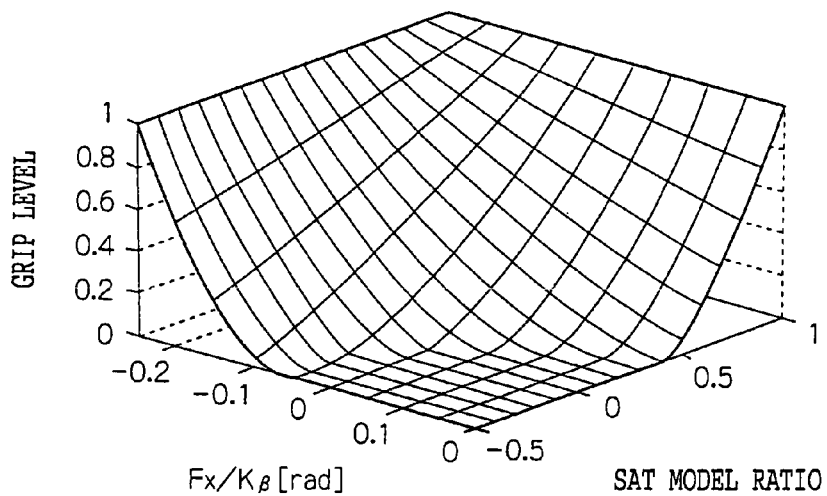
FIG. 16 is another three-dimensional map of grip level ϵ, the SAT model ratio γ, and the $F_x/K_\beta$.

FIG. 16 gives a result of solving Eq. (211) for grip level $\epsilon=\xi_s^3$ as a three-dimensional map for the SAT model ratio γ and $F_x/K_\beta$. As is the case with FIG. 15, if such a three-dimensional map is previously given, there is no need for solving Eq. (211), and the grip level can be easily determined from γ and $F_x/K_\beta$. The map as shown in FIG. 16 features that the grip level is always equal to 1 at a SAT model ratio of 1 and an $F_x/K_\beta$ value of −0.25, and as SAT model ratio is decreased 1 or the $F_x/K_\beta$ is increased from −0.25, the grip level is reduced, in other words, the grip level monotonically increases with respect to the SAT model ratio and monotonically decreases with respect to the $F_x/K_\beta$. Further, the map as shown in FIG. 16 includes no vehicle parameters, such as the grounding length, and thus when the grip level is to be estimated utilizing the steering wheel torque after compensation for the caster trail, the same three-dimensional map can always be used, even if the vehicle specifications are changed.

By the way, the SAT model value can be determined from Eq. (206), however, in the above embodiment, it is determined as the front-rear direction quantity of state ($F_x/K_\beta$) including the lateral force resisting stiffness for a given slip angle, $K_\beta$, thus, the SAT model value is computed from the lateral force, the front-rear direction quantity of state ($F_x/K_\beta$), and the grounding length. However, if the lateral force resisting stiffness $K_\beta$ for a given slip angle is handled as a parameter, the self-aligning torque model value is computed from the lateral force, the braking/driving force $F_x$, and the $K_\beta$ and grounding length as parameters.

Fourth Embodiment

Next, a fourth embodiment will be described.

Figure 17:
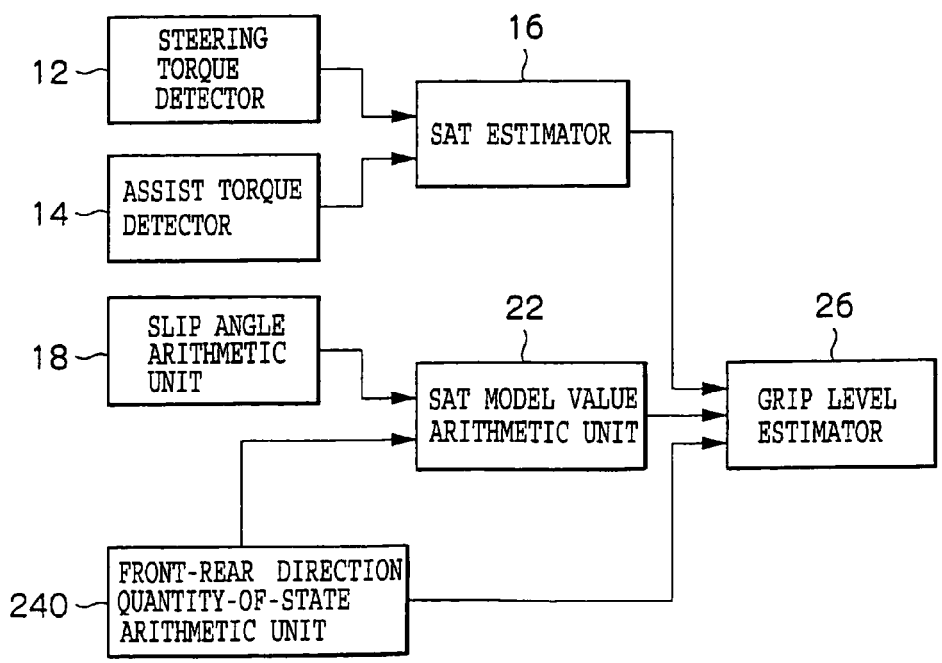
FIG. 17 is a block diagram for a grip level estimation apparatus according to a fourth embodiment.

As shown in FIG. 17, a grip level estimation apparatus according to the present embodiment has the same parts of the configuration as those of the above-described third embodiment (see FIG. 13), thus the same parts are provided with the same sign, the description thereof being omitted, and the different parts will be described. In other words, the grip level estimation apparatus according to the present embodiment comprises the slip angle arithmetic unit 18 as shown in FIG. 1 in place of the lateral force detector 180 in the third embodiment (FIG. 13).

Next, the principle of computation of the grip level in braking/driving according to the present embodiment will be described.

The torque $T_s$ transmitted to the steering wheel axis can be expressed as follows, using the lateral slip and braking/driving force, and $\xi_s$,

[Math. 75]

Math. 75

$$T_s = -\frac{l}{6g_h}K_s\kappa_y\xi_s^3 - \frac{l_c}{3g_h}K_s\kappa_y(1+\xi_s+\xi_s^2) - \frac{l}{5g_h}K_s\kappa_y \cdot \frac{F_x}{K_\beta} \cdot \frac{1+2\xi_s+3\xi_s^2+4\xi_s^3}{1+\xi_s+\xi_s^2} \quad (301)$$

In addition, herein, the value when it is assumed that the grip level=1 in Eq. (301), i.e.,

[Math. 76]

Math. 76

$$T_{s0} = -\left\{\frac{l}{6g_h} + \frac{l_c}{8_h} + \frac{2l}{3g_h} \cdot \frac{F_x}{K_\beta}\right\}K_s\kappa_y \quad (302)$$

is to be the SAT model value. In other words, the SAT model value can be determined also from the ($F_x/K_\beta$) as the front-rear direction quantity of state (or the braking/driving force $F_x$), and the lateral slip $\kappa_y$ as the lateral direction quantity of state.

Now, assuming that the ratio between Eq. (301) and Eq. (302) is the SAT ratio $\gamma$, i.e.,

[Math. 77]

Math. 77

$$\gamma = \frac{T_s}{T_{s0}} \quad (303)$$

the following relationship stands up.

[Math. 78]

Math. 78

$$\left(\frac{l}{6} + l_c + \frac{2l}{3}\frac{F_x}{K_\beta}\right)\gamma(1+\xi_s+\xi_s^2) = \frac{l}{6}\xi_s^3(1+\xi_s+\xi_s^2) + \frac{l_c}{3}(1+\xi_s+\xi_s^2)^2 + \frac{l}{5} \cdot \frac{F_x}{K_\beta} \cdot (1+2\xi_s+3\xi_s^2+4\xi_s^3) \quad (304)$$

Therefore, by utilizing the relationship in Eq. (304), the grip level $\epsilon$ can be derived from the SAT model ratio $\gamma$ and $F_x/K_\beta$ as follows:

[Math. 79]

Math. 79

$$\epsilon = \xi_s^3$$

Next, the method of the present embodiment will be described. The description of the same parts of the function as those of the above-described embodiment is omitted, and the different parts of the function will be described.

The SAT model value arithmetic unit 22 computes the SAT model value $T_{s0}$ from the above equation (302), using the front-rear direction quantity of state ($F_x/K_\beta$) outputted from the front-rear direction quantity-of-state arithmetic unit 240, the lateral slip $\kappa_y$ detected by the slip angle arithmetic unit 18, the steering gear ratio $g_h$, the caster trail $l_c$, and the grounding length l.

The grip level estimator 26 according to the present embodiment computes the SAT model ratio $\gamma$, which is the ratio between the torque $T_s$ (Eq. (301)) transmitted to the steering wheel axis that is estimated by the SAT estimator 16 and the SAT model value $T_{s0}$ (Eq. (302)) estimated by the SAT model value arithmetic unit 22, from the above equation (303).

And, the grip level estimator 26 estimates the grip level $\epsilon = \xi_s^3$ from Eq. (304) using the computed SAT model ratio $\gamma$, the front-rear direction quantity of state ($F_x/K_\beta$) outputted from the front-rear direction quantity-of-state arithmetic unit 240, the caster trail $l_c$, and the grounding length l. Also in this case, instead of Eq. (304), the map, data table, and relational expression which represent the relationship of the grip level $\epsilon$ to the SAT model ratio $\gamma$ and the front-rear direction quantity of state ($F_x/K_\beta$) may be previously determined for estimation of the grip level $\epsilon = \xi_s^3$.

Fifth Embodiment

Next, a fifth embodiment will be described.

Figure 18:
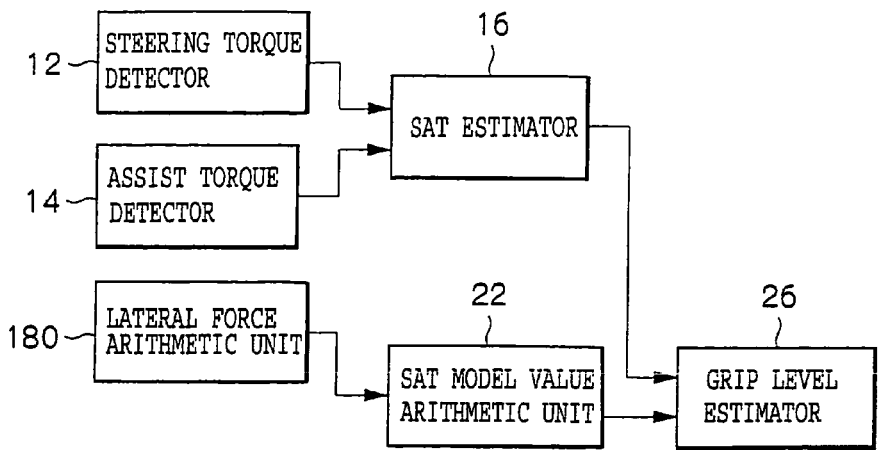
FIG. 18 is a block diagram for a grip level estimation apparatus according to a fifth embodiment.

As shown in FIG. 18, a grip level estimation apparatus according to the present embodiment has substantially the same configuration as that of the above-described third embodiment (see FIG. 13), thus the same parts are provided with the same sign, the description thereof being omitted, and the different parts will be described. In other words, with the grip level estimation apparatus according to the present embodiment, the front-rear direction quantity-of-state arithmetic unit 240 is connected only to the SAT model value arithmetic unit 22.

Next, the principle of computation of the grip level in the region not involving braking/driving according to the present embodiment will be described.

In the region not involving braking/driving, the torque $T_s$ transmitted to the steering wheel axis can be expressed as follows using the lateral force and $\xi_s$,

[Math. 80]

Math. 80

$$T_s = \left\{\frac{l}{2g_h} \cdot \frac{\xi_s^3}{1+\xi_s+\xi_s^2} + \frac{l_c}{g_h}\right\}F_y \quad (311)$$

In addition, herein, the value when it is assumed that the grip level=1 in Eq. (311), i.e.,

[Math. 81]

Math. 81

$$T_{s0} = \left\{\frac{l}{6g_h} + \frac{l_c}{g_h}\right\}F_y \qquad (312)$$

is to be the SAT model value. In other words, the SAT model value can be determined using the lateral force $F_y$ as the lateral direction quantity of state, and the prescribed tire parameter (the grounding length l).

Now, assuming that the ratio between Eq. (311) and Eq. (312) is the SAT ratio γ, i.e.,

[Math. 82]

Math. 82

$$\gamma = \frac{T_s}{T_{s0}} \qquad (313)$$

the following relationship stands up.

[Math. 83]

Math. 83

$$\left(\frac{l}{6} + l_c\right)\gamma(1 + \xi_s + \xi_s^2) = \frac{l}{2}\xi_s^3 + l_c(1 + \xi_s + \xi_s^2) \qquad (314)$$

Therefore, by utilizing the relationship in Eq. (314), the grip level ε can be derived from the SAT model ratio γ as follows:

[Math. 84]

Math. 84

$$\epsilon = \xi_s^3$$

Next, the method of the present embodiment will be described. The description of the same parts of the function as those of the above-described embodiment is omitted, and the different parts of the function will be described.

The SAT model value arithmetic unit 22 computes the SAT model value $T_{s0}$ from the above equation (312), using the lateral force $F_y$ detected by the lateral force detector 180, the steering gear ratio $g_h$, the caster trail $l_c$, and the grounding length l.

The grip level estimator 26 according to the present embodiment computes the SAT model ratio γ, which is the ratio between the SAT ($T_s$ Eq. (311)) estimated by the SAT estimator 16 and the SAT model value $T_{s0}$ (Eq. (312)) estimated by the SAT model value arithmetic unit 22, from the above equation (313).

And, the grip level estimator 26 estimates the grip level $\epsilon = \xi_s^3$ from Eq. (314) using the computed SAT model ratio γ, the caster trail $l_c$, and the grounding length l. Also in this case, instead of Eq. (314), the map, data table, and relational expression which represent the relationship between the grip level ε and the SAT model ratio γ may be previously determined for estimation of the grip level $\epsilon = \xi_s^3$.

Sixth Embodiment

Next, a sixth embodiment will be described. A grip level estimation apparatus according to the present embodiment has the same configuration as that of the above-described first embodiment (see FIG. 1), thus the description thereof is omitted.

Next, the principle of computation of the grip level according to the present embodiment will be described.

First, assuming that the braking/driving forces of the right-hand and left-hand wheels are identical, the torque $T_s$ transmitted to the steering wheel axis is expressed as follows:

[Math. 85]

Math. 85

$$T_s = -\frac{(l_l K_{sl} + K_{sr})}{6g_h}\kappa_y \xi_s^3 - \frac{l_c(K_{sl} + K_{sr})}{3g_h}\kappa_y(1 + \xi_s + \xi_s^2) - \qquad (401)$$

$$\left(\frac{l_l K_{sl}}{K_{\beta l}} + \frac{l_l K_{sr}}{K_{\beta r}}\right)\frac{F_x}{5g_h}\kappa_y \cdot \frac{1 + 2\xi_s + 3\xi_s^2 + 4\xi_s^3}{1 + \xi_s + \xi_s^2}$$

$$= -\frac{l_0 K_{s0}}{6g_h}\frac{\left(\frac{F_{zf}}{2} + \Delta F_z\right)^{\frac{3}{2}} + \left(\frac{F_{zf}}{2} - \Delta F_z\right)^{\frac{3}{2}}}{\left(\frac{F_{zf0}}{2}\right)^{\frac{3}{2}}}\kappa_y \xi_s^3 -$$

$$\frac{2l_c K_{s0}F_{zf}}{3g_h F_{zf0}}\kappa_y(1 + \xi_s + \xi_s^2) - \kappa_y(1 + \xi_s + \xi_s^2) -$$

$$\frac{l_0 K_{s0}}{K_{\beta 0}}\frac{\sqrt{\frac{F_{zf}}{2} + \Delta F_z} + \sqrt{\frac{F_{zf}}{2} - \Delta F_z}}{\sqrt{\frac{F_{zf0}}{2}}}\frac{F_x}{5g_h}\kappa_y \cdot$$

$$\frac{1 + 2\xi_s + 3\xi_s^2 + 4\xi_s^3}{1 + \xi_s + \xi_s^2}$$

In the above expression, the suffixes l and r for the grounding length and the tire stiffness mean the left and right wheels, respectively, $F_{z0}$ being the static load on the front axis (the static load on the front two wheels), $F_z$ being the load on the front axis (the load on the front two wheels) in consideration of the front-rear load variation, and $\Delta F_z$ being the amount of load variation for the front left and right wheels. $\Delta F_z$ is the amount of load variation for the front left and right wheels, and can be approximated as follows from the lateral acceleration signal $g_y$, and the roll stiffness distribution (the front wheel loading rate) $\gamma_{roll}$ and front wheel tread $T_f$.

[Math. 86]

Math. 86

$$\Delta F_z = \frac{hM\gamma_{roll}}{T_f}|g_y| \qquad (402)$$

where $|g_y|$ denotes the absolute value of $g_y$. In this case, the SAT model value $T_{s0}$ can be expressed as follows:

[Math. 87]

Math. 87

$$T_{s0} = -\frac{l_0 K_{s0}}{6g_h}\frac{\left(\frac{F_{zf}}{2} + \Delta F_z\right)^{\frac{3}{2}} + \left(\frac{F_{zf}}{2} - \Delta F_z\right)^{\frac{3}{2}}}{\left(\frac{F_{zf0}}{2}\right)^{\frac{3}{2}}}\kappa_y - \qquad (403)$$

$$\frac{2l_c K_{s0}F_{zf}}{g_h F_{zf0}}\kappa_y$$

In other words, the SAT model value $T_{s0}$ is determined using the lateral slip $\kappa_y$ as the lateral direction quantity of state, and the amount of load variation for the front left and right wheels, $\Delta F_z$.

In this case, the linear model ratio $\gamma$ is computed as follows:

[Math. 88]

Math. 88

$$\gamma = \frac{a_1}{a_1 + 3a_2}\xi_s^3 + \frac{a_2}{a_1 + 3a_2}(1 + \xi_s + \xi_s^2) + \frac{a_3}{a_1 + 3a_2}F_x\frac{1 + 2\xi_s + 3\xi_s^2 + 4\xi_s^3}{1 + \xi_s + \xi_s^2} \quad (404)$$

$$a_1 = \frac{l_0}{6}\frac{\left(\frac{F_{zf}}{2} + \Delta F_z\right)^{\frac{3}{2}} + \left(\frac{F_{zf}}{2} - \Delta F_z\right)^{\frac{3}{2}}}{\left(\frac{F_{zf0}}{2}\right)^{\frac{3}{2}}} \quad (405)$$

$$a_2 = \frac{2l_c}{3}\frac{F_{zf}}{F_{zf0}} \quad (406)$$

$$a_3 = \frac{l_0}{5K_{\beta 0}}\frac{\sqrt{\frac{F_{zf}}{2} + \Delta F_z} + \sqrt{\frac{F_{zf}}{2} - \Delta F_z}}{\sqrt{\frac{F_{zf0}}{2}}} \quad (407)$$

Therefore, the grip level $\epsilon$ can be derived as follows from the SAT model ratio $\gamma$ and the braking/driving force $F_x$ on the basis of Eqs. (404) to (407):

[Math. 89]

Math. 89

$$\epsilon = \xi_s^3 \quad (408)$$

Next, the function of the grip level estimation apparatus according to the present embodiment will be described. The grip level estimation apparatus according to the present embodiment has the same parts of the function as those of the above-described first embodiment, and thus the different parts of the function will be described.

The SAT model value arithmetic unit 22 computes the linear model output for the SAT, i.e., the SAT model value on the basis of Eq. (403) from the lateral slip $\kappa_y$ computed by the slip angle arithmetic unit 18 and the amount of load variation for the front left and right wheels, $\Delta F_z$, estimated by the load variation estimator 20.

The SAT model ratio arithmetic unit 28 in the grip level estimator 26 computes the ratio $\gamma$ of the SAT estimate to the SAT model value as the SAT model ratio from the SAT estimate and the SAT model value on the basis of Eq. (404). And, the grip level output unit 30 computes the grip level from the linear model ratio $\gamma$ and the braking/driving force $F_x$ on the basis of Eqs. (404) to (407). Also in this case, instead of Eqs. (404) to (407), the map, data table, and relational expression which represent the relationship of the grip level $\epsilon$ to the SAT model ratio $\gamma$ and the front-rear direction quantity of state (the braking/driving force $F_x$) may be previously determined for estimation of the grip level.

Figure 19A:
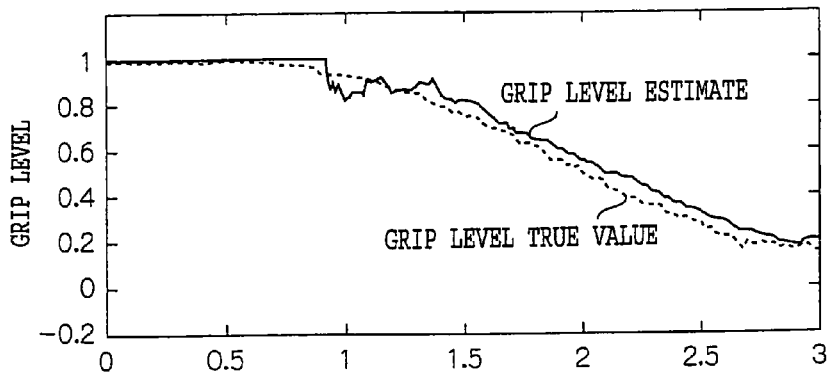
FIG. 19A is a graph showing the grip level estimation result in turning on the dry road in consideration of the effects of the lateral load variation that is compared with the grip level true value.
Figure 19B:
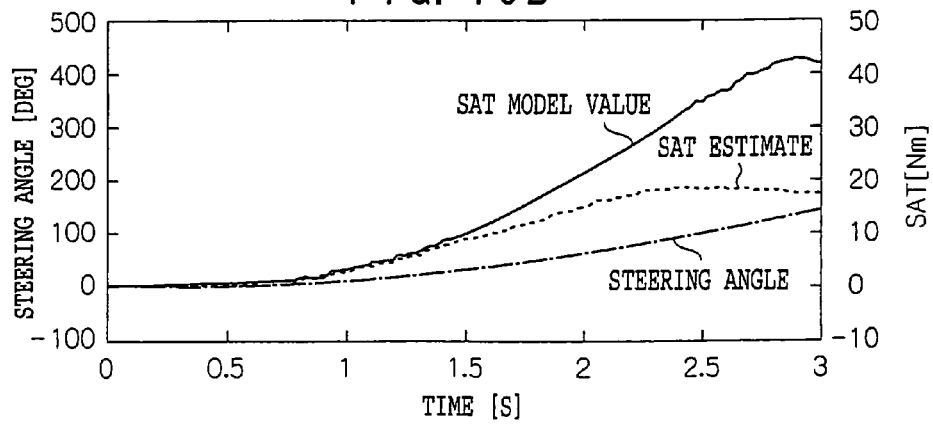
FIG. 19B is a graph showing the SAT model value and the like in this case.

FIG. 19A and FIG. 19B compare the result of estimation of the grip level in turning on the dry road (see FIG. 19A) with the grip level true value when the SAT model value (see FIG. 19B) is set in consideration of the lateral load variation $\Delta F_z$ on the basis of Eq. (403).

Figure 20A:
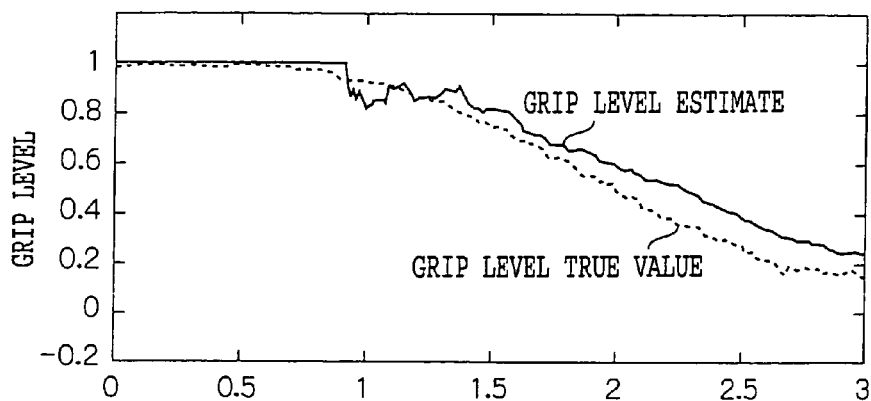
FIG. 20A is a graph showing the grip level estimation result in turning on the dry road in no consideration of the effects of the lateral load variation that is compared with the grip level true value.
Figure 20B:
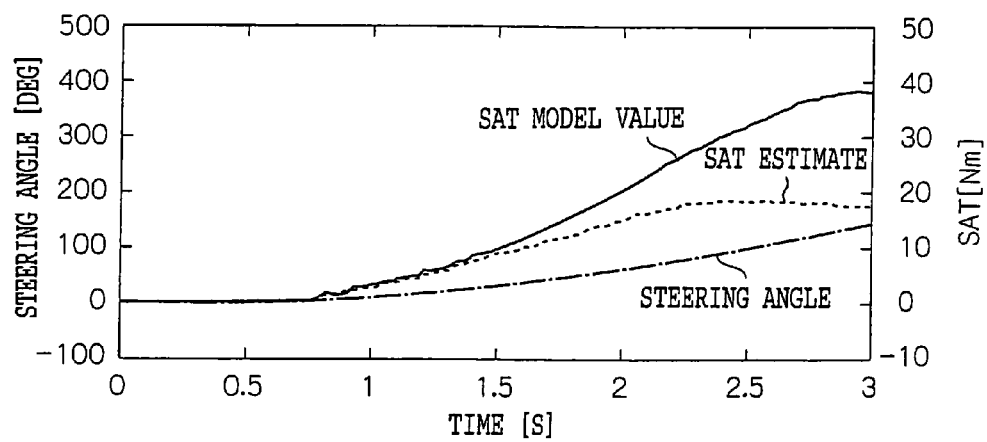
FIG. 20B is a graph showing the SAT model value and the like in this case.

FIG. 20A and FIG. 20B compare the result of estimation of the grip level in turning on the dry road (see FIG. 20A) with the grip level true value when the SAT model value (see FIG. 20B) is set as follows in no consideration of the effects of the lateral load variation.

[Math. 90]

Math. 90

$$T_{s0} = -\frac{l_0 K_{s0}}{3g_h}\left(\frac{F_{zf}}{F_{zf0}}\right)^{\frac{3}{2}}\kappa_y - \frac{2l_c K_{s0}F_{zf}}{g_h F_{zf0}}\kappa_y \quad (411)$$

The grip level true value is a value computed on the assumption that the road surface $\mu$ is constant (0.9), and by regarding that "grip level true value=1–$\mu$ utilization rate=1–actual result $\mu$ value/road surface $\mu$", from the actual result $\mu$ obtained by normalizing the front-rear force and the lateral force generated in the front wheels by the load.

By comparing FIG. 19A and FIG. 19B with FIG. 20A and FIG. 20B, it can be seen that considering the effects of the lateral load variation improves the accuracy of the grip level estimation.

Seventh Embodiment

Next, a seventh embodiment will be described.

A grip level estimation apparatus according to the present embodiment has the same parts of the configuration as those of the above-described third embodiment (see FIG. 13), thus the same parts are provided with the same sign, the description thereof being omitted, and the different parts will be described. In other words, as shown in FIG. 21, the lateral force arithmetic unit 180 for the grip level estimation apparatus according to the present embodiment comprises a lateral force estimator 340 which computes the lateral force estimate for the front wheels from the vehicle velocity and the steering angle on the basis of the vehicle linear model; a high-pass filter 360 which high-pass-processes the lateral force estimate; a lateral force arithmetic unit 380 which computes the lateral force to the front wheels from the quantities of the vehicle motion states; a lateral force converter 400; a low-pass filter 420 which low-pass-processes the slip angle converted value; and an adder 440 which adds the lateral forces following the high-pass-filter and low-pass-filter processing for computing the combined lateral force. The respective devices (340 to 440) can be configured with a computer.

Next, the principle of computation of the SAT model value according to the present embodiment will be described.

The grounding length is increased in proportion to the square root of the load, and the cornering power for the respective wheels and the lateral force are increased proportionately to the load, which can be expressed as follows:

[Math. 91]

Math. 91

$$l_l = l_0\sqrt{\frac{F_{zl}}{F_{zl0}}}, \quad l_r = l_0\sqrt{\frac{F_{zr}}{F_{zr0}}} \quad (500)$$

$$K_{\beta l} = K_{\beta 0}\frac{F_{zl}}{2F_{zl0}}, \quad K_{\beta r} = K_{\beta 0}\frac{F_{zr}}{2F_{zr0}} \quad (501)$$

$$F_{yl} = F_y\frac{F_{zl}}{2F_{zl0}}, \quad F_{yr} = F_y\frac{F_{zr}}{2F_{zr0}} \quad (502)$$

In the above expressions, the suffix O denotes the non-load varying state, and the suffixes l and r mean the value is for the left and right wheels, respectively. Therefore, it can be expected that the accuracy of the grip level estimation is improved by considering such effects of the load variation in computing the SAT model value.

Herein, in addition to the assumptions of Eqs. (500) to (502), assuming that the braking/driving forces to the right and left wheels are identical, i.e.,

[Math. 92]

Math. 92

$$F_{xl} = F_{xr} \frac{F_x}{2} \quad (503)$$

the SAT model value (the steering torque in the high grip-level state), which is the total SAT for the right and left two wheels, can be expressed as follows:

[Math. 93]

Math. 93

$$T_{s0} = \frac{1}{g_h} \left\{ \frac{1}{2} \cdot (l_l F_{yl} + l_r F_{yr}) + l_c (F_{yl} + F_{yr}) + \frac{3}{5} \cdot \left( \frac{F_{xl} l_l F_{yl}}{K_{\beta l}} + \frac{F_{xr} l_r F_{yr}}{K_{\beta r}} \right) \right\} \quad (504)$$

$$= \frac{1}{g_h} \left\{ \frac{l_0}{2} W_1 + l_c + \frac{3}{5} l_0 W_2 \frac{F_x}{K_{\beta 0}} \right\} F_y$$

$$W_1 = \frac{\left(\frac{F_{zl}}{F_{zl0}}\right)^{\frac{3}{2}} + \left(\frac{F_{zr}}{F_{zr0}}\right)^{\frac{3}{2}}}{2}, \quad W_2 = \frac{\left(\frac{F_{zl}}{F_{zl0}}\right)^{\frac{1}{2}} + \left(\frac{F_{zr}}{F_{zr0}}\right)^{\frac{1}{2}}}{2}$$

In addition, when the steering axis torque after compensation for the caster trail is utilized, the SAT model value can be expressed as follows:

[Math. 94]

Math. 94

$$T_{sc0} = \frac{1}{g_h} \left\{ \frac{l_0}{2} W_1 + \frac{3}{5} l_0 W_2 \frac{F_x}{K_{\beta 0}} \right\} F_y \quad (505)$$

By considering the effects of the load variation in deriving the SAT model value, as with Eq. (504) or (505), the accuracy of the grip level estimation can be expected to be improved.

Next, the function of the present embodiment will be described.

The SAT estimator 16 estimates the SAT generated between the road surface and the tire by eliminating the friction in the steering system from the sum of the steering torque and the assist torque. When there is a difference in braking/driving force between the right and left wheels, the torque resulting from the difference in braking/driving is reduced for compensation before eliminating the friction. In other words, the SAT before elimination of the friction is computed on the basis of the following expression:

[Math. 95]

Math. 95

$$T_{fric} = T_{sw} + T_{ma} - l_k \Delta F_x \quad (506)$$

and then the friction elimination computation (the same one as in the first embodiment) is implemented on the determined $T_{fric}$ to find the SAT estimate $T_s$. Herein, $T_{fric}$ is SAT before friction elimination, $T_{sw}$ is steering torque, $T_{ma}$ is assist torque, $\Delta F_x$ is difference in braking/driving force between right and left wheels, and $l_k$ is king pin offset. The lateral force estimator 340 in the lateral force arithmetic unit 180 estimates the front wheel lateral force from the vehicle velocity and the steering angle on the basis of the vehicle linear model. Herein, estimation of the front wheel lateral force is performed with the following equations of state, utilizing the dynamic characteristic of the vehicle motion.

[Math. 96]

Math. 96

$$\frac{d}{dt}\begin{bmatrix} v \\ r \end{bmatrix} = \left( \begin{bmatrix} 0 & -1 \\ 0 & 0 \end{bmatrix} u + \begin{bmatrix} -\frac{c_f + c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix} \middle/ u \right) \begin{bmatrix} v \\ r \end{bmatrix} + \begin{bmatrix} \frac{c_f}{M g_h} \\ \frac{L_f c_f}{I_z g_h} \end{bmatrix} \theta_p \quad (507)$$

$$F_{yE} = -c_f [1 \quad L_f] \bigg/ u \begin{bmatrix} v \\ r \end{bmatrix} + \frac{c_f \theta_p}{g_h} \quad (508)$$

where v is lateral velocity (m/s); r is yaw rate (rad/s); $F_{yE}$ is front wheel lateral force estimate (N); u is vehicle velocity (M/s); $C_{f,r}$ is front/rear wheel cornering power (N/rad); $L_{f,r}$ is front/rear axle to center-of-gravity distance (m); M is vehicle mass (kg); $I_z$ is yaw inertia (kgm$^2$); $g_h$ is steering gear ratio; and $\theta_p$ is steering wheel angle. The $c_f$ is the same as the above-mentioned $K_\beta$. Discretizing Eqs. (507) and (508) by the sample time τ to express them as functions of the vehicle velocity gives:

[Math. 97]

Math. 97

$$x(k+1) = \left( \begin{bmatrix} 1 & 0 \\ 0 & 1 \end{bmatrix} + \begin{bmatrix} 0 & -\tau \\ 0 & 0 \end{bmatrix} u(k) + \tau A_s / u(k) \right) x(k) + \tau B_s \theta_p(k) \quad (509)$$

$$F_{fE}(k) = -c_f [1 \quad L_f] x(k) / u(k) + c_f \theta_p(k) / g_h \quad (510)$$

where $$A_s = \begin{bmatrix} -\frac{c_f + c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix}, \quad B_s = \begin{bmatrix} \frac{c_f}{M g_h} \\ \frac{L_f c_f}{I_z g_h} \end{bmatrix}$$

The lateral force arithmetic unit 380 computes the lateral force to the front wheels from the quantities of the vehicle motion states. By transforming the following equations of motion for the vehicle body:

[Math. 98]

Math. 98

$$M\left(\frac{dv}{dt} + ru\right) = F_{yf} + F_{yr} \quad (511)$$

$$I_z \frac{dr}{dt} = L_f F_{yf} - L_r F_{yr} \quad (512)$$

where $F_{yf}$ is front wheel lateral force; and $F_{yr}$ is rear wheel lateral force, the lateral force to the front wheels can be expressed as follows:

[Math. 99]

Math. 99

$$F_{yf} = \frac{L_r M g_y + I_z \frac{dr}{dt}}{L_f + L_r} \quad (513)$$

where $g_y$: Lateral acceleration $\frac{dv}{dt} + ru$

The lateral force converter 400 computes the lateral force on the basis of Eq. (513), and outputs the result as the lateral force computed value $F_{yC}$.

The high-pass filter 360 is constituted as a first-order discrete-time filter. By the way, the continuous-time filter is expressed by the following transfer function:

[Math. 100]

Math. 100

$$G_H(s) = \frac{s}{s + \omega_b} \quad (514)$$

where $\omega_b$ is folding frequency for filter. By using the Tustin transformation or other technique to transform this expression, the discrete-time filter can be designed. If the sampling time is expressed as $\tau$, and the time-advanced operator is z, the Tustin transformation can be executed by substituting the following equation:

[Math. 101]

Math. 101

$$s = \frac{2(z-1)}{\tau(z+1)}$$

into Eq. (514), and the discrete-time filter in this case can be expressed as follows:

[Math. 102]

Math. 102

$$G_H(z) = \frac{2(z-1)}{(\tau \omega_b + 2)z + \tau \omega_b - 2} \quad (515)$$

In addition, the low-pass filter 420 is constituted as a first-order discrete-time filter having the same folding frequency as the high-pass filter 360. The continuous-time filter is expressed as:

[Math. 103]

Math. 103

$$G_L(s) = \frac{\omega_b}{s + \omega_b} \quad (516)$$

and being Tustin-transformed, this is expressed as:

[Math. 104]

Math. 104

$$G_L(z) = \frac{\tau \omega_b (z+1)}{(\tau \omega_b + 2)z + \tau \omega_b - 2} \quad (517)$$

Herein, the sum of the high-pass filter 360 and the low-pass filter 420 which are designed is 1. This means that, when an identical signal is inputted to the high-pass filter 360 and the low-pass filter 420, and the outputs from these are added, the original signal is restored. Herein, by high-pass-filter processing the lateral force estimate including a drift error in the low-frequency region for elimination of the drift error; low-pass-filter processing the lateral force computed value including a noise and a phase lag in the high-frequency region to eliminate the fluctuation components in the high-frequency region, and adding the signals after being processed by these filters, the lateral force which is free from the effects of the drift error, the noise, and the like can be computed. The folding frequency mentioned here is rendered free from the noise associated with the road surface disturbance that is included in the lateral force computed value, and is set at a value which can accommodate the road surface cant varying velocity in advancing into a bank road, or the like. The lateral forces after being high-pass-filter processed and low-pass-filter processed are added to be used as the integrated lateral force for computation of the grip level. In other words,

[Math. 105]

Math. 105

$$F_{yl}(z) = G_H(z) \cdot F_{yE}(z) + G_L(z) \cdot F_{yC}(z) \quad (518)$$

where $F_{yl}$ is integrated lateral force.

The front-rear direction quantity-of-state arithmetic unit 240 computes the braking/driving force $F_x$ generated in the front wheels by adding the driving force determined by multiplying the engine output torque $T_{eng}$ by the gear ratio $g_e$ and the differential gear ratio $g_d$, and by dividing the result of the multiplication by the tire effective radius $r_w$, to the braking force determined by multiplying the braking hydraulic power $P_b$ by the constant $k_{brake}$ as follows:

[Math. 106]

Math. 106

$$F_x = \frac{g_e g_d}{r_w} T_{eng} - k_{brake} \cdot P_b \quad (519)$$

and further divides the result by the front wheel cornering power reference value to output the final result as the front-rear direction quantity of state $F_x/K_{\beta 0}$.

The SAT model value arithmetic unit 22 computes the SAT model value as follows on the basis of the lateral direction quantity of state $F_{yl}$, and the front-rear direction quantity of state $F_x/K_{\beta 0}$.

[Math. 107]

Math. 107

$$T_{s0} = \frac{1}{g_h}\left\{\frac{l_0}{2}W_1 + l_c + \frac{3}{5}l_0 W_2 \frac{F_x}{K_{\beta 0}}\right\} F_{yl} \quad (520)$$

where $$W_1 = \frac{\left(\frac{F_{zl}}{F_{zl0}}\right)^{\frac{3}{2}} + \left(\frac{F_{zr}}{F_{zr0}}\right)^{\frac{3}{2}}}{2}, \quad W_2 = \frac{\left(\frac{F_{zl}}{F_{zl0}}\right)^{\frac{1}{2}} + \left(\frac{F_{zr}}{F_{zr0}}\right)^{\frac{1}{2}}}{2}$$

The SAT model ratio arithmetic unit 28 in the grip level estimator 26 computes the ratio of the SAT estimate $T_s$ to the SAT model value $T_{s0}$ as follows, and outputs the result as the SAT model ratio $\gamma$.

[Math. 108]

Math. 108

$$\gamma = \frac{T_s}{T_{s0}} \qquad (521)$$

The grip level output unit 30 computes the grip level from the SAT model ratio γ and the front-rear direction quantity of state $F_x/K_{\beta 0}$ on the basis of the two-dimensional map (refer to the above-described third embodiment), and the like.

Figure 22A:
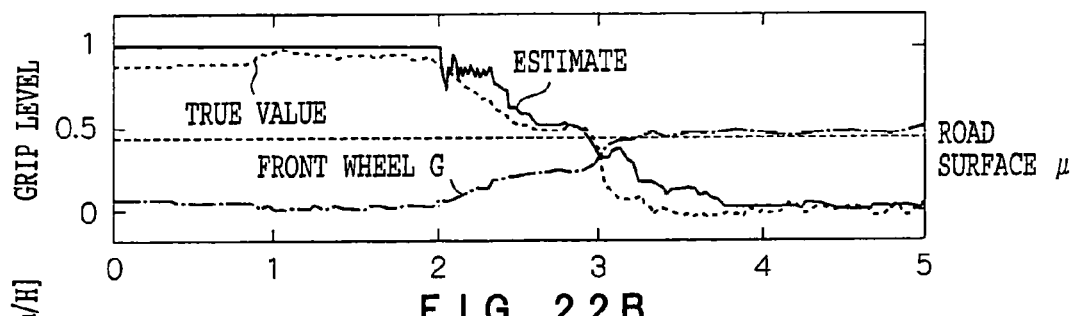
FIG. 22A to FIG. 22C are graphs showing the grip level estimation result when the turning-while-accelerating experiment was carried out on an artificial low-μ road having a road surface μ=0.45.
Figure 22B:
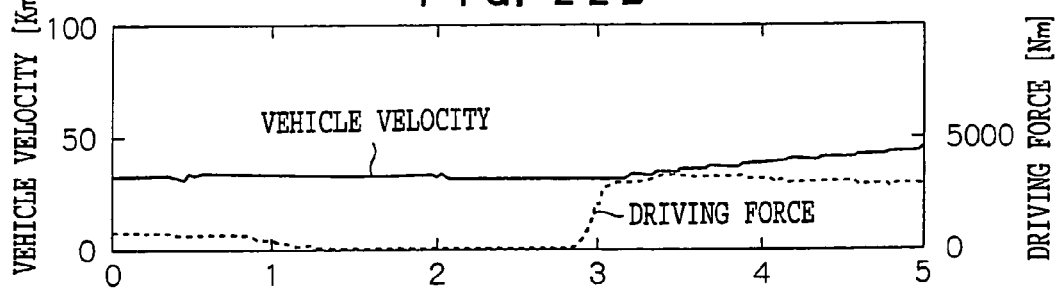
Figure 22C:
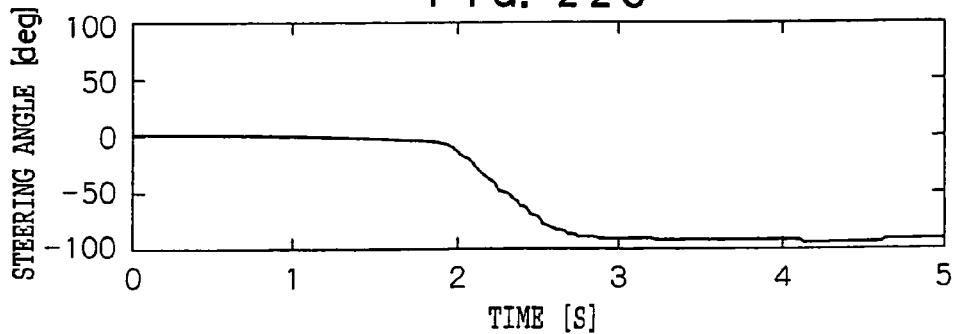

FIG. 22A to FIG. 22C show the grip level estimation result when the turning-while-accelerating experiment was carried out on an artificial low-μ road having a road surface μ=0.45. In this experiment, at 2 s in FIG. 22A to FIG. 22C, steering was given, and at 3 s, acceleration equivalent to 0.1 G was given, a good correspondence being shown between the grip level true value determined from the acceleration and the known road surface value (=0.45), and the estimate.

Eighth Embodiment

Next, an eighth embodiment will be described.

A grip level estimation apparatus according to the present embodiment has the same parts of the configuration as those of the above-described third embodiment (see FIG. 13), thus the same parts are provided with the same sign, the description thereof being omitted, and the different parts will be described. In other words, as shown in FIG. 23, the grip level estimation apparatus according to the present embodiment comprises a steering torque detector 12, an assist torque detector 14, an SAT estimator 16, a lateral force arithmetic unit 180 which computes the lateral force to the front wheels, a front-rear direction quantity-of-state arithmetic unit 240 which computes the front-rear direction quantity of state for the front wheels, an SAT model value arithmetic unit 22, and a grip level estimator 26 which estimates the grip level for the front wheels.

The grip level estimation apparatus according to the present embodiment further comprises a road surface friction coefficient arithmetic unit 100 which computes the road surface friction coefficient (the road surface μ), a braking/driving force arithmetic unit 540 which computes the braking/driving force to the rear wheels, a lateral force arithmetic unit 182 which computes the lateral force to the rear wheels, and a grip level estimator 126 which estimates the grip level for the rear wheels. The road surface friction coefficient arithmetic unit 100, the lateral force arithmetic unit 182, and the grip level estimator 126 can be configured with a computer.

Next, the function of the present embodiment will be described. The function in the present embodiment has the same parts of the function as those of the above-described third embodiment, thus the description of the same parts of the function is omitted, and the different parts of the function will be mainly described.

As in the above-described third embodiment, the grip level estimator 26 estimates the grip level for the front wheels. The road surface friction coefficient arithmetic unit 100 computes the road surface friction coefficient (the road surface μ) in the following manner. In other words, the road surface μ is computed from the grip level $\epsilon_f$ for the front wheels, the braking/driving force $F_{xf}$ and lateral force $F_{yf}$ for the front wheels, and the load $W_f$ for the front wheels on the basis of the following equation:

[Math. 109]

Math. 109

$$\mu = \frac{\sqrt{F_{xf}^2 + F_{yf}^2}}{(1-\varepsilon_f)W_f} \qquad (601)$$

The braking/driving force $F_{xr}$ can be obtained from the braking/driving force estimator 42 (see FIG. 14) in the front-rear direction quantity-of-state arithmetic unit 240. The braking/driving force arithmetic unit 540 computes the braking/driving force $F_{xr}$ to the rear wheels, and the lateral force arithmetic unit 182 computes the lateral force $F_{yr}$ to the rear wheels. And, in the present embodiment, the grip level estimator 126 estimates the grip level $\epsilon_r$ for the rear wheels from the road surface friction coefficient μ computed by the road surface friction coefficient arithmetic unit 100 on the assumption that the road surface μ values for the front and rear wheels are identical; the braking/driving force $F_{xr}$ and lateral force $F_{yr}$ to the rear wheels; and the load $W_r$ on the rear wheels, on the basis of the following equation:

[Math. 110]

Math. 110

$$\varepsilon_r = 1 - \frac{\sqrt{F_{xr}^2 + F_{yr}^2}}{\mu W_r} = 1 - \sqrt{\frac{F_{xr}^2 + F_{yr}^2}{F_{xf}^2 + F_{yf}^2}} \frac{W_f}{W_r}(1-\varepsilon_f) \qquad (602)$$

Ninth Embodiment

Next, a ninth embodiment will be described.

A grip level estimation apparatus according to the present embodiment has the same parts of the configuration as those of the above-described eighth embodiment (see FIG. 23), thus the same parts are provided with the same sign, the description thereof being omitted, and the different parts will be described. In other words, as shown in FIG. 24, the grip level estimation apparatus according to the present embodiment omits the road surface friction coefficient arithmetic unit 100 in the eighth embodiment (see FIG. 23), and the lateral force arithmetic unit 180, the braking/driving force estimator 42 (see FIG. 14) in the front-rear direction quantity-of-state arithmetic unit 240, and the grip level estimator 26 are connected to the grip level estimator 126.

Next, the function of the present embodiment will be described. The function in the present embodiment has the same parts of the function as those of the above-described eighth embodiment, thus the description of the same parts of the function is omitted, and the different parts of the function will be mainly described.

The grip level estimator 126 estimates the grip level for the rear wheels in the following manner. In other words, in addition to the assumption that the road surface μ values for the front and rear wheels are identical, assuming that the ratio between the lateral forces to the front and rear wheels equals to the ratio between the loads on the front and rear wheels, i.e.,

[Math. 111]

Math. 111

$$|F_{yf}| : |F_{yr}| = W_f : W_r \qquad (603)$$

the following equation is derived,

[Math. 112]

Math. 112

$$F_{yr} = \frac{W_r}{W_f} F_{xf} \quad (604)$$

and in this case, the grip level for the rear wheels is expressed as follows:

[Math. 113]

Math. 113

$$\varepsilon_r = 1 - \sqrt{\frac{W_f^2 F_{xr}^2 + W_r^2 F_{yf}^2}{W_r^2 F_{xf}^2 + W_r^2 F_{yf}^2}} (1 - \varepsilon_f) \quad (605)$$

In other words, the grip level estimator 126 estimates the rear wheel grip level $\varepsilon_r$, from the front wheel grip level $\varepsilon_f$, the front wheel braking/driving force $F_{xf}$, the front wheel lateral force $F_{yf}$, and the front wheel load $W_f$; the rear wheel load $W_r$, the rear wheel braking/driving force $F_{xr}$, and the rear wheel lateral force $F_{yr}$, on the basis of Eq. (605).

Tenth Embodiment

Next, the tenth embodiment will be described.

Figure 25:
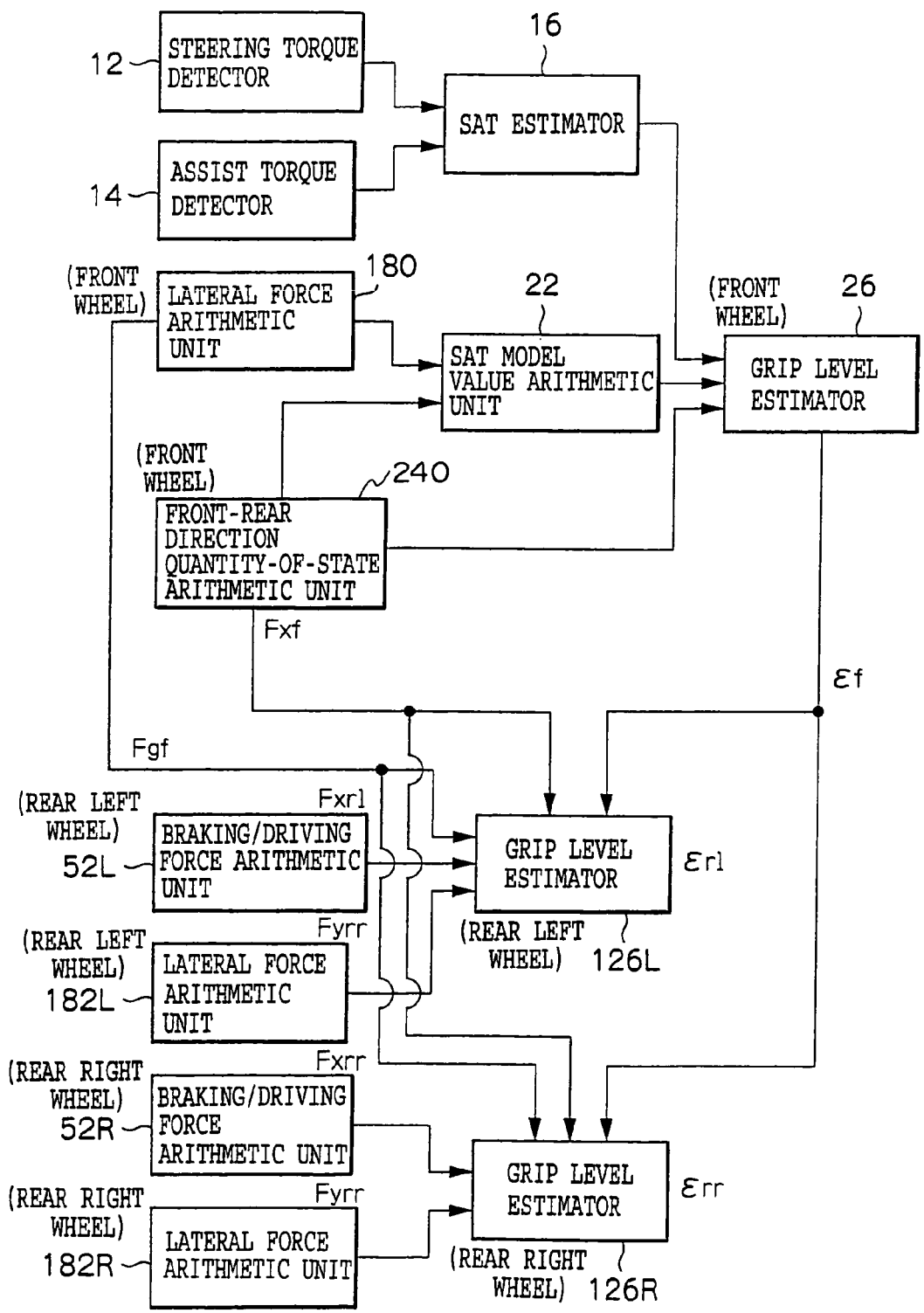
FIG. 25 is a block diagram for a grip level estimation apparatus according to a tenth embodiment.

A grip level estimation apparatus according to the present embodiment has the same parts of the configuration as those of the above-described ninth embodiment (see FIG. 24), thus the same parts are provided with the same sign, the description thereof being omitted, and the different parts will be described. In other words, as shown in FIG. 25, the grip level estimation apparatus according to the present embodiment comprises a lateral force arithmetic unit 182L, 182R; a braking/driving force estimator 52L, 52R; and a grip level estimator 126L, 126R for the respective rear left and right wheels in the ninth embodiment (see FIG. 23).

Next, the function of the present embodiment will be described. The function in the present embodiment has the same parts of the function as those of the above-described tenth embodiment, thus the description of the same parts of the function is omitted, and the different parts of the function will be mainly described.

Assuming that the road surface μ values for the left and right wheels are identical, the grip level $\varepsilon_{fl}$, $\varepsilon_{fr}$, $\varepsilon_{rl}$, $\varepsilon_{rr}$ (the suffixes fl, fr, rl, and rr denote front left, front right, rear left, and rear right, respectively) can be expressed as follows using the braking/driving force (front-rear force) $F_{xfl}$, $F_{xfr}$, $F_{xrl}$, $F_{xrr}$; the lateral force $F_{yfl}$, $F_{yfr}$, $F_{yrl}$, $F_{yrr}$; and the load $W_{fl}$, $W_{fr}$, $W_{rl}$, $W_{rr}$ for the respective wheels:

[Math. 114]

Math. 114

$$\varepsilon_{fl} = 1 - \frac{\sqrt{F_{xfl}^2 + F_{yfl}^2}}{\mu W_{fl}} \quad (606)$$

$$\varepsilon_{fr} = 1 - \frac{\sqrt{F_{xfr}^2 + F_{yfr}^2}}{\mu W_{fr}} \quad (607)$$

$$\varepsilon_{rl} = 1 - \frac{\sqrt{F_{xrl}^2 + F_{yrl}^2}}{\mu W_{rl}} \quad (608)$$

$$\varepsilon_{rr} = 1 - \frac{\sqrt{F_{xrr}^2 + F_{yrr}^2}}{\mu W_{rr}} \quad (609)$$

By the way, in order to estimate the grip level for the respective wheels, it is required to know the braking/driving force and lateral force to the respective wheels, as is obvious from Eqs. (606) to (609). The driving force can be assumed to be identical for the right and left wheels, and the braking force to each particular wheel can be estimated from the wheel hydraulic pressure for that wheel. On the other hand, for the lateral force, only the total value for the right and left wheels can be estimated from the vehicle motion, and the value for each particular wheel cannot be derived. Therefore, herein, noting the nature that the lateral force generated in the tire for a given wheel is substantially in proportion to the load on the wheel, the lateral force to each wheel is expressed as follows using the total lateral force to the right and left wheels.

[Math. 115]

Math. 115

$$F_{yfl} = \frac{W_{fl}}{W_f} F_{yf} \quad (610)$$

$$F_{yfr} = \frac{W_{fr}}{W_f} F_{yf} \quad (611)$$

$$F_{yrl} = \frac{W_{rl}}{W_r} F_{yr} \quad (612)$$

$$F_{yrr} = \frac{W_{rr}}{W_r} F_{yr} \quad (613)$$

Therefore, substituting Eqs. (601), and (610) to (613) into Eqs. (606) to (609), the following equations are given.

[Math. 116]

Math. 116

$$\varepsilon_{fl} = 1 - \sqrt{\frac{W_f^2 F_{xfl}^2 + W_{fl}^2 F_{yf}^2}{W_{fl}^2 F_{xf}^2 + W_{fr}^2 F_{yf}^2}} (1 - \varepsilon_f) \quad (614)$$

$$\varepsilon_{fr} = 1 - \sqrt{\frac{W_f^2 F_{xfr}^2 + W_{fr}^2 F_{yf}^2}{W_{fr}^2 F_{xf}^2 + W_{fr}^2 F_{yf}^2}} (1 - \varepsilon_f) \quad (615)$$

$$\varepsilon_{rl} = 1 - \sqrt{\frac{W_r^2 F_{xrl}^2 + W_{rl}^2 F_{yr}^2}{W_r^2 F_{xf}^2 + W_r^2 F_{yf}^2}} \cdot \frac{W_f}{W_{rl}} (1 - \varepsilon_f) \quad (616)$$

$$\varepsilon_{rr} = 1 - \sqrt{\frac{W_r^2 F_{xrr}^2 + W_{rr}^2 F_{yr}^2}{W_r^2 F_{xf}^2 + W_r^2 F_{yf}^2}} \cdot \frac{W_f}{W_{rr}} (1 - \varepsilon_f) \quad (617)$$

In addition, as is the case with the estimation of the grip levels for the front and rear wheels, assuming that the ratio between the lateral forces to the front and rear wheels equals to the ratio between the loads on the front and rear wheels, the following equations are derived,

[Math. 117]

Math. 117

$$F_{yrl} = \frac{W_{rl}}{W_f} F_{yf} \quad (618)$$

$$F_{yrr} = \frac{W_{rr}}{W_f} F_{yf} \quad (619)$$

and the grip level for the respective rear left and right wheels is expressed as follows:
[Math. 118]

Math. 118

$$\varepsilon_{rl} = 1 - \sqrt{\frac{W_f^2 F_{xrl}^2 + W_{rl}^2 F_{yf}^2}{W_{rl}^2 F_{xf}^2 + W_{rl}^2 F_{yf}^2}} (1 - \varepsilon_f) \quad (620)$$

$$\varepsilon_{rr} = 1 - \sqrt{\frac{W_f^2 F_{xrr}^2 + W_{rr}^2 F_{yf}^2}{W_{rr}^2 F_{xf}^2 + W_{rr}^2 F_{yf}^2}} (1 - \varepsilon_f) \quad (621)$$

In other words, the grip level estimator 126L for the rear left wheel determines the grip level for the rear left wheel $\varepsilon_{rl}$ from Eq. (620) using the front wheel grip level $\varepsilon_f$, the front wheel load $W_f$, the rear left wheel load $W_{rl}$, the front wheel braking/driving force $F_{xf}$, the front wheel lateral force $F_{yf}$, and the rear left wheel braking/driving force $F_{xrl}$.

Likewise, the grip level estimator 126R for the rear right wheel determines the grip level for the rear right wheel $\varepsilon_{rr}$ from Eq. (622) using the front wheel grip level $\varepsilon_f$, the front wheel load $W_f$, the rear right wheel load $W_{rr}$, the front wheel braking/driving force $F_{xf}$, the front wheel lateral force $F_{yf}$, and the rear right wheel braking/driving force $F_{xrr}$.

In this way, in the above-described second embodiment, and the eighth to tenth embodiments, the grip level for the respective rear wheels can be estimated. As a result of this, the grip levels for the front and rear wheels under braking can be fed back for carrying out the distribution control of the braking force such that the grip level is equalized. In this case, the allowance for grip level for the respective wheels under braking is improved, resulting in the safety of vehicle motion being bettered.

In addition, in the estimation of the grip level for the rear wheels on the basis of Eq. (605) in the ninth embodiment, the phase of the rear wheel lateral force estimation is matched to the front wheel lateral force generation, whereby estimation in early phase can be performed, as compared to the estimation of the grip level for the rear wheels on the basis of Eq. (602) in the eighth embodiment.

Here is a description of applications for the first embodiment to the tenth embodiment.

First Application

Driving force distribution control (including TRC, engine control, 4WD)

Figure 26:
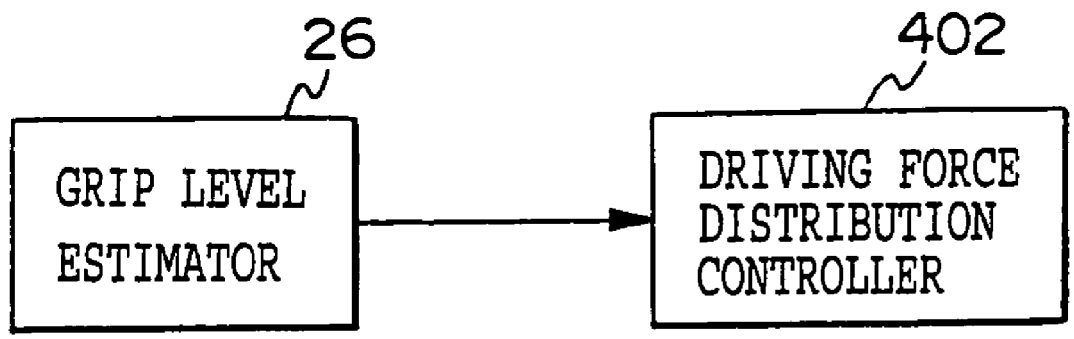
FIG. 26 is a schematic diagram illustrating the configuration of a first application.

The present application comprises a driving force distribution controller 400 connected to the above-described grip level estimator 26 as shown in FIG. 26.

The driving force distribution controller 400 connected to the grip level estimator 26 (in the sixth embodiment or the seventh embodiment) carries out throttle control on the basis of the μ estimate before the driven wheels are slipped under acceleration in turning while accelerating. The grip level estimate on the basis of the SAT provides a feature that it allows a reduction in grip level to be detected before a behavior of the wheels to which the driving force is reflected (an acceleration slippage) is caused. Then, the driving force distribution controller 400 provides control, such as slightly squeezing the throttle, at the time when the grip level is lowered. Thereby, the acceleration slippage of the wheels can be prevented.

The driving force distribution controller 400 connected to the grip level estimator 26 (in the second embodiment) carries out the grip level estimation for the right and left wheels separately, and when the grip level for a particular wheel is lowered, that wheel is braked. Thereby, the driving force to the wheel which grip level is lowered is suppressed for recovery of the grip level and optimizing the driving force distribution between the right and left wheels. In addition, when the grip level is lowered for both wheels, the engine torque is decreased.

Second Application

Figure 27:
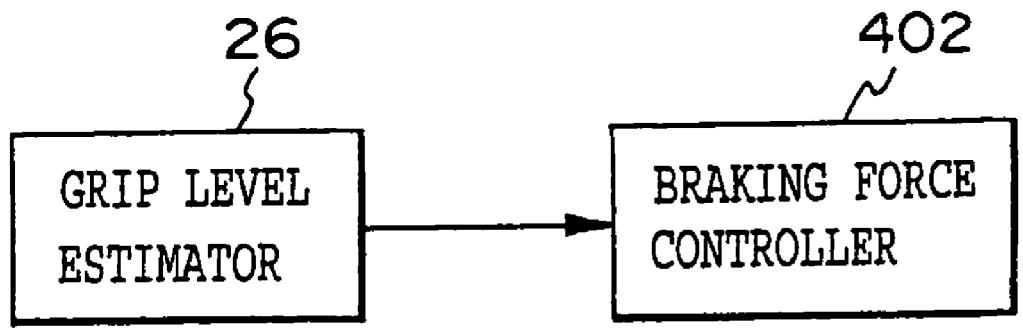
FIG. 27 is a schematic diagram illustrating the configuration of a second application.

The present application comprises a braking force controller 402 connected to the above-described grip level estimator 26 (in any one of the first embodiment to the tenth embodiment) as shown in FIG. 27.

The present application has a variety of aspects as listed below. Hereinbelow, each aspect will be described.

Braking force distribution control (including ABS)

The braking force controller 402 connected to the above-described grip level estimator 26 (in the second embodiment) determines the braking force in performing the braking force distribution in turning while braking such that the grip level is uniform for the four wheels. Thereby, the robustness against estimation error about the limit friction force μW (road surface μ×load) for the four wheels is increased. In addition, in the region where it is impossible to estimate the grip level, the estimated μW is used, while, in the region where it is impossible, the grip level is used alternatively.

Conventionally, when an optimum braking force distribution is to be implemented, it has been assumed that the μ is the same for any wheels, and the load has been estimated with the previously set static load being compensated for the vehicle body acceleration, the braking force distribution having been carried out on the basis of the distribution of this estimated load. However, this technique presents a problem that it cannot accommodate a change in load distribution that is associated with a change in load capacity and the like, and a variation in road surface μ encountered with a road surface having different friction coefficients for the right and left wheels, or the like, thus not always providing an optimum distribution.

Contrarily to this, when the braking force distribution on the basis of the grip level estimates according to the present invention which estimates the respective grip levels for the four wheels under braking is carried out, in other words, the braking force is determined such that the grip level is uniform for the four wheels, the vehicle is controlled such that the grip level allowance for the limit friction force is uniform, which makes it possible to always assure an optimum braking force distribution.

When the braking force controller 402 connected to the above-described grip level estimator 26 (in the sixth embodiment or the seventh embodiment) detects a grip level drop in turning while braking before the ABS functioning, it sets the control starting sensitivity for the ABS at a slightly lower value for prevention of the wheel velocity from being lowered before the ABS starts to function.

Conventionally, the control starting sensitivity for the ABS has been set at a slightly higher value in order to prevent malfunctioning due to a road surface disturbance, or the like. As a result of this, the wheel velocity is decreased (the wheel lock tendency) at the start of the control, and to recover from such decrease, there has been the need for greatly reducing the wheel cylinder hydraulic pressure at the start of the control.

However, it is undesirable to cause a great reduction at the start of the control, because the braking force generated in the tires is decreased.

The grip level estimate on the basis of the SAT provides a feature that it allows a reduction in grip level to be detected before a behavior of the wheels to which the braking force is reflected (the wheel lock) is caused. By setting the control starting sensitivity for the ABS at a slightly lower value when a grip level drop is detected, the wheel velocity from being lowered at the start of the control can be prevented.

The prior art (Laid-Open Publication No. 10-71493/1998) detects the grip level allowance on the basis of the wheel velocity to use it for determination of the ABS control starting, however, as compared to such prior art which estimates the grip level allowance on the basis of the wheel velocity, the present invention utilizes the SAT, allowing a grip level reduction to be detected fast (in the region where an allowance is still given) with accuracy, and thus the ABS control starting sensitivity to be set more appropriately.

When the vehicle is moved from a low-μ road surface to a high-μ one during turning while ABS-braking, the recovery of the grip level is observed while the boosting rate for the front wheels is increased, or for the rear wheels, forecasting boosting is provided.

VSC (OS, US, Precharge)

When OS (Oversteering)

The braking force controller 402 connected to the above-described grip level estimator 26 (in the second embodiment or any of the eighth embodiment to the tenth embodiment) brakes the outside wheels when the grip level for the rear wheels is lowered to a certain threshold level or under. The intensity of braking is determined from the map by μ. When the grip level is restored to a certain level, the control is terminated. An application where, when the grip level for the rear wheels is lowered to a certain threshold level or under, the braking for the outside wheels is precharged for prevention of the start of the VSC control from being delayed is possible.

The conventional VSC has determined the start of the control by detecting the oversteering from the change in yaw rate to which the lateral force is reflected.

Contrarily to this, utilization of the grip level estimation allows the occurrence of oversteering to be predicted before a yaw rate change is caused, and by braking the outside wheels, the oversteering can be prevented, or by precharging, the delay of the start can be avoided.

With oversteering, the grip level for the rear wheels is lowered as compared to that for the front wheels, resulting in the balance of the lateral forces to the front and rear wheels being deteriorated, which causes a change in yaw rate. The conventional VSC feeds back the change in yaw rate that has been produced as a result.

Contrarily to this, the present technique directly estimates the drop of the grip level for the rear wheels, which is the cause rather than the result, and carries out the vehicle control on the basis of this in a feed forward-like manner. Therefore, the occurrence of oversteering can be prevented.

When US (Understeering)

The braking force controller 402 connected to the above-described grip level estimator 26 (in any of the above-described embodiments) carries out driftout control by controlling the brake when the grip level for the front wheels approaches the limit.

With the conventional VSC, the detection of the understeering has also been performed from the change in yaw rate to which the lateral force is reflected. Contrarily to this, utilization of the grip level estimation allows the occurrence of oversteering to be predicted before a yaw rate change is caused, and by performing the brake control for generation of an inward moment, or reducing the vehicle velocity, the occurrence of understeering can be prevented.

With understeering, the grip level for the front wheels is lowered as compared to that for the rear wheels, resulting in the balance of the lateral forces to the front and rear wheels being deteriorated, which causes a change in yaw rate. The conventional VSC feeds back the change in yaw rate that has been produced as a result.

Contrarily to this, the present technique directly estimates the drop of the grip level for the front wheels, which is the cause rather than the result, and carries out the vehicle control on the basis of this in a feed forward-like manner. Therefore, the occurrence of understeering can be prevented.

When Four-wheel Drift

The braking force controller 402 connected to the above-described grip level estimator 26 (in the second embodiment or any one of the eighth embodiment to the tenth embodiment) uses the front and rear wheel individual grip level estimate for detecting the four-wheel drift.

With the conventional VSC, a change in yaw rate that is created by deterioration of the balance of the lateral forces to the front and rear wheels is detected for carrying out the OS or US control, thus there arises a problem that, when the grip levels for the four wheels are simultaneously lowered to the limit without any change in yaw rate being caused, in other words, in the four-wheel drift, the start of the control is delayed.

Contrarily to this, when the grip levels for the front and rear wheels are individually estimated, a simultaneous grip level drop for the four wheels, which is a cause for occurrence of four-wheel drift, can be directly estimated, thus, the four-wheel drift can be appropriately prevented without any delay of the start of the control, which has been a conventional problem.

The braking force controller 402 provide control so as to reduce the vehicle velocity when a simultaneous grip level drop is detected for the four wheels. In the event of a four-wheel drift, the grip levels for the front and rear wheels are lowered, thus in order to restore the grip levels, it is required to reduce the vehicle velocity.

The braking force controller 402 renders the tire loading rate for the respective wheels uniform while reducing the vehicle velocity such that the four wheels restore the grip level simultaneously. By carrying out the braking force distribution among the respective wheels such that the grip levels for the wheels are balanced, the grip levels can be restored while the balance of the lateral forces to the front and rear wheels being kept, in other words, without any change in the behavior of the vehicle being caused.

The braking force controller 402 carries out the braking force distribution control such that the rear wheels restore the grip level first, in other words, such that the grip level for the front wheels is low as compared to that for the rear wheels. By such control, the vehicle behavior shows the driftout tendency, but the motion with which importance is attached to the safety can be realized.

The braking force controller 402 carries out steering control such that the lateral force is maximized for both front and rear wheels. In the situation where a four-wheel drift is caused, the lateral force limit is exceeded for both front and rear wheels. Therefore, by appropriately reducing the steering angle, the slip angle is reduced to an angle at which the lateral force is maximized.

Steering Angle

The braking force controller 402 connected to the above-described grip level estimator 26 (in the second embodiment or any one of the eighth embodiment to the tenth embodiment) decreases the front wheel steering angle when the grip level for the rear wheels is lowered to a certain threshold level or under. Thereby, the occurrence of oversteering is prevented.

When the grip level for the rear wheels is lowered, there arises a possibility that the balance of the lateral forces to the front and rear wheels may be deteriorated, resulting in occurrence of oversteering. Therefore, by decreasing the front wheel steering angle to decrease the lateral force to the front wheels, the balance of the lateral forces can be restored for prevention of oversteering from occurring. Also in this case, unlike the control method which detects the oversteering from a change in yaw rate or the like for decreasing the front wheel steering angle on the basis of it, the present technique directly detects the grip level for the front wheels, which can be a cause for occurrence of oversteering, and thus realizes vehicle control in a feed forward-like manner, allowing oversteering to be prevented from occurring.

Suspension Control

The braking force controller 402 connected to the above-described grip level estimator 26 (in the second embodiment or any one of the eighth embodiment to the tenth embodiment) increases the stiffness of the stabilizer for the front wheels to set it such that the difference in load between the right and left front wheels is increased. Thereby, the difference in load between the right and left rear wheels is decreased to enhance the grip level for the rear wheels for prevention of oversteering from being caused. Contrarily, when the grip level for the front wheels is lowered to a certain threshold level or under, the stiffness of the stabilizer for the front wheels is reduced to decrease the difference in load between the right and left front wheels for enhancing the grip level for the front wheels to prevent occurrence of understeering. In addition, when the grip levels for both front and rear wheels are lowered, priority is given to the recovery of the grip level for the rear wheels, the stiffness of the stabilizer for the front wheels being enhanced, thus the vehicle behavior with which importance is attached to the safety is realized.

When either the grip level for the front wheels or that for the rear wheels is lowered, the damper constant for the skyhook damper is set at a decreased value for realization of the suspension characteristic with which importance is attached to the grounding capability. (With this feature, the μ-slope estimation in Laid-Open Publication No. 2001-3540020 has been replaced with the grip level estimation utilizing SAT.)

EXPLANATION OF REFERENCE NUMERALS AND SIGNS IN THE DRAWINGS

16 Sat estimator
18 Slip angle arithmetic unit
20 Load variation estimator
22 Sat model value arithmetic unit
24 Braking/driving force estimator
26 Grip level estimator
180 Lateral force arithmetic unit
240 Front-rear direction quantity-of-state arithmetic unit
100 Road surface friction coefficient arithmetic unit
52 Braking/driving force arithmetic unit
182 Lateral force arithmetic unit
126 Grip level estimator

What is claimed is:

1. A tire grip level estimation apparatus comprising:
self-aligning torque acquisition means which estimates or detects self-aligning torque generated on the grounding surface of wheels;
lateral direction quantity-of-state computation means which computes lateral direction quantity of state generated in said wheels;
front-rear direction quantity-of-state computation means which computes front-rear direction quantity of state generated in said wheels;
self-aligning model value computation means which computes self-aligning torque model value on the basis of said lateral direction quantity of state and one or more tire parameters;
ratio computation means which computes self-aligning ratio, which is the ratio between the self-aligning torque estimated or detected by said self-aligning torque acquisition means and the self-aligning torque model value computed by said self-aligning model value computation means; and
grip level estimation means which estimates a grip level of the tires on the basis of said self-aligning ratio and said front-rear direction quantity of state from a predetermined map representing the relationship between the self-aligning ratio, the front-rear direction quantity of state, and the grip level, wherein
said front-rear direction quantity of state is front-rear force or quotient obtained by dividing the front-rear force by the cornering power.

2. The tire grip level estimation apparatus of claim 1, wherein said lateral direction quantity of state is slip angle, and said tire parameters are the tire grounding length and the tire stiffness.

3. The tire grip level estimation apparatus of claim 1, wherein said lateral direction quantity of state is lateral force, said front-rear direction quantity of state is front-rear force, and tire parameters are the tire grounding length and the tire stiffness.

4. The tire grip level estimation apparatus of claim 1, wherein said lateral direction quantity of state is lateral force, and said one or more tire parameters is the tire grounding length.

5. The tire grip level estimation apparatus of claim 1, further comprising:
vehicle velocity detection means which detects vehicle velocity, and
steering angle detection means which detects steering angle,
wherein said lateral direction quantity-of-state computation means comprises:
estimation means which estimates lateral force generated in the tires from said vehicle velocity and said steering angle on the basis of vehicle linear model;
a high-pass filter for high-pass-filter processing of the lateral force estimated by said lateral force estimation means;
lateral force computation means which computes the lateral force generated in the tires from the quantities of vehicle state;
a low-pass filter for low-pass-filter processing of the lateral force computed by said lateral force computation means; and
computation means which computes the sum of the lateral force which is high-pass-filter processed by said high-pass filter and the lateral force which is low-pass-filter processed by said low-pass filter, as the lateral direction quantity of state.

6. The tire grip level estimation apparatus of claim 1, wherein said front-rear direction quantity-of-state computation means comprises:

braking/driving force estimation means which estimates the braking/driving force on the basis of engine output and braking hydraulic pressure; and a divider which computes the front-rear direction quantity of state by dividing said braking/driving force by cornering power.

7. A tire grip level estimation apparatus comprising:

self-aligning torque acquisition means which estimates or detects self-aligning torque generated on the grounding surface of wheels;

lateral direction quantity-of-state computation means which computes lateral direction quantity of state generated in said wheels;

self-aligning model value computation means which computes a self-aligning torque model value on the basis of said lateral direction quantity of state, front-rear direction quantity of state, and tire parameter;

ratio computation means which computes a self-aligning ratio, which is the ratio between the self-aligning torque estimated or detected by said self-aligning torque acquisition means and the self-aligning torque model value computed by said self-aligning model value computation means; and grip level estimation means which estimates a grip level of the tires on the basis of said self-aligning ratio from a predetermined map representing the relationship between the self-aligning ratio and the grip level.

8. The tire grip level estimation apparatus of claim 7, wherein the map represents the relationship between the self-aligning ratio, the front-rear direction quantity of state, and the grip level, and said tire grip level estimation means estimates the grip level of the tires using said front-rear direction quantity of state in addition to said self-aligning ratio.

9. A tire grip level estimation apparatus comprising:

self-aligning torque acquisition means which estimates or detects self-aligning torque generated on the grounding surface of wheels;

slip angle computation means which computes slip angle generated in said wheels;

self-aligning torque model value computation means which computes self-aligning torque model value on the basis of the slip angle computed by said slip angle computation means, and grounding length and stiffness of said wheels;

self-aligning torque ratio computation means which computes self-aligning torque ratio, which is the ratio between the self-aligning torque estimated by said self-aligning torque acquisition means and the self-aligning torque model value computed by said self-aligning model value computation means;

braking/driving force estimation means which estimates the braking/driving force generated in the wheels for braking/driving a vehicle; and grip level estimation means which estimates a grip level for said wheels on the basis of the self-aligning torque ratio computed by said self-aligning torque ratio computation means and the braking/driving force estimated by said braking/driving force estimation means from a predetermined map representing the relationship between the self-aligning ratio, the braking/driving force, and the grip level.

10. The tire grip level estimation apparatus of claim 9, wherein said grip level estimation means comprises storage means which previously stores the map representing a relationship among the self-aligning torque ratio, the braking/driving force and the grip level,
and estimates the grip level for said wheels on the basis of the self-aligning torque ratio computed by said self-aligning torque ratio computation means and the braking/driving force estimated by said braking/driving force estimation means, and said relationship represented by the map stored by said storage means.

11. The tire grip level estimation apparatus of claim 9, wherein the grounding length and stiffness of said wheels are predetermined values.

12. The tire grip level estimation apparatus of claim 9, further comprising load condition acquisition means which estimates or detects condition of load on said wheels, wherein the grounding length and stiffness of said wheels are determined on the basis of the condition of load on said wheels that is estimated by said load condition acquisition means.

13. The tire grip level estimation apparatus of claim 9, wherein said slip angle computation means comprises:

slip angle estimation means which estimates the slip angle from the vehicle velocity and the steering angle on the basis of the vehicle linear model;

a high-pass filter for high-pass-filter processing of the slip angle estimated by said slip angle estimation means;

lateral force computation means which computes the lateral force to said wheels;

slip angle conversion means which divides the lateral force computed by said lateral force computation means by the cornering power for said wheels for computing the slip angle converted from the lateral force;

a low-pass filter for low-pass-filter processing of the slip angle converted by said slip angle conversion means; and addition means which adds the slip angle high-pass-filter processed by said high-pass filter to the slip angle low-pass-filter processed by said low-pass filter for computing the slip angle generated in said wheels.

14. The tire grip level estimation apparatus of claim 9, wherein said wheels are the front wheels of said vehicle.

15. The tire grip level estimation apparatus of claim 9, wherein said wheels are all the wheels mounted to said vehicle.

16. The tire grip level estimation apparatus of claim 9, wherein said slip angle computation means comprises:

slip angle estimation means which estimates the slip angle from the vehicle velocity and the steering angle on the basis of the vehicle linear model;

a high-pass filter for high-pass-filter processing of the slip angle estimated by said slip angle estimation means;

lateral force computation means which computes the lateral force to said wheels;

slip angle conversion means which divides the lateral force computed by said lateral force computation means by the cornering power for said wheels for computing the slip angle converted from the lateral force;

a low-pass filter for low-pass-filter processing of the slip angle converted by said slip angle conversion means; and addition means which adds the slip angle high-pass-filter processed by said high-pass filter to the slip angle low-pass-filter processed by said low-pass filter for computing the slip angle generated in said wheels;

wherein said wheels are the front wheels of said vehicle.

17. The tire grip level estimation apparatus of claim 9, wherein said slip angle computation means comprises:

slip angle estimation means which estimates the slip angle from the vehicle velocity and the steering angle on the basis of the vehicle linear model;

a high-pass filter for high-pass-filter processing of the slip angle estimated by said slip angle estimation means;

lateral force computation means which computes the lateral force to said wheels;

slip angle conversion means which divides the lateral force computed by said lateral force computation means by the cornering power for said wheels for computing the slip angle converted from the lateral force;

a low-pass filter for low-pass-filter processing of the slip angle converted by said slip angle conversion means; and addition means which adds the slip angle high-pass-filter processed by said high-pass filter to the slip angle low-pass-filter processed by said low-pass filter for computing the slip angle generated in said wheels;

wherein said wheels are all the wheels mounted to said vehicle.

* * * * *